US011983905B2

(12) United States Patent
Wan et al.

(10) Patent No.: US 11,983,905 B2
(45) Date of Patent: May 14, 2024

(54) METHODS FOR LEVEL PARTITION OF POINT CLOUD, AND DECODER

(71) Applicant: GUANGDONG OPPO MOBILE TELECOMMUNICATIONS CORP., LTD., Dongguan (CN)

(72) Inventors: Shuai Wan, Dongguan (CN); Lei Wei, Dongguan (CN); Fuzheng Yang, Dongguan (CN); Xiaobin Ding, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/128,227

(22) Filed: Mar. 30, 2023

(65) Prior Publication Data

US 2023/0237705 A1    Jul. 27, 2023

Related U.S. Application Data

(63) Continuation of application No. PCT/CN2020/119707, filed on Sep. 30, 2020.

(51) Int. Cl.
*G06T 9/00* (2006.01)
(52) U.S. Cl.
CPC .................... *G06T 9/001* (2013.01)
(58) Field of Classification Search
CPC ...... H04N 19/70; H04N 19/174; H04N 19/30; H04N 19/597; H04N 21/845;
(Continued)

(56) References Cited

U.S. PATENT DOCUMENTS 6,331,826 B1 * 12/2001 Wagner .................. G06T 9/005
341/59
10,897,269 B2    1/2021 Mammou
(Continued)

FOREIGN PATENT DOCUMENTS

CN    103077549 B    12/2016
CN    108470374 A    8/2018
(Continued)

OTHER PUBLICATIONS

Mehlem, Dominik et al. "JVET-R0376 Versatile Video Coding for VPCC"Joint Video Experts Team (JVET) of ITU-T SG 16 WP 3 and ISO/IEC JTC 1/SC 29/WG 11 18th Meeting: by teleconference, Apr. 15-24, 2020, Apr. 24, 2020 (Apr. 24, 2020), entire document.
(Continued)

*Primary Examiner* — Mekonen T Bekele
(74) *Attorney, Agent, or Firm* — BAYES PLLC

(57) ABSTRACT

A method for level partition of a point cloud includes: decoding a point cloud bitstream, the point cloud bitstream including geometry information and attribute information of the point cloud; determining a maximum permissible value of a first syntax element in the point cloud bitstream; parsing the point cloud bitstream to determine a value of the first syntax element according to the maximum permissible value; determining, according to the value of the first syntax element, a number of levels of detail (LODs) in a process of decoding the attribute information; and decoding the attribute information according to the number of the LODs and the geometry information, to determine a reconstructed point cloud of the point cloud.

20 Claims, 10 Drawing Sheets

(58) Field of Classification Search
CPC .............. H04N 21/816; H04N 21/84; H04N 21/85406; G06T 9/001
See application file for complete search history.

(56) References Cited

U.S. PATENT DOCUMENTS

| | | |
|---|---|---|
| 2014/0198097 A1 | 7/2014 | Evans |
| 2018/0012400 A1 | 1/2018 | Evans |
| 2019/0081638 A1 | 3/2019 | Mammou et al. |
| 2020/0413096 A1* | 12/2020 | Zhang .................... H04N 19/96 |
| 2021/0211734 A1* | 7/2021 | Ray ........................ H04N 19/70 |

FOREIGN PATENT DOCUMENTS

| | | | |
|---|---|---|---|
| CN | 110418135 A | * 11/2019 | ........... H04N 19/124 |
| CN | 110418135 A | 11/2019 | |
| CN | 111641984 A | 9/2020 | |
| IN | 109257604 A | 1/2019 | |

OTHER PUBLICATIONS

International Search Report in the international application No. PCT/CN2020/119707, dated Jul. 7, 2021.
Written Opinion of the International Search Authority in the international application No. PCT/CN2020/119707, dated Jul. 7, 2021.

* cited by examiner

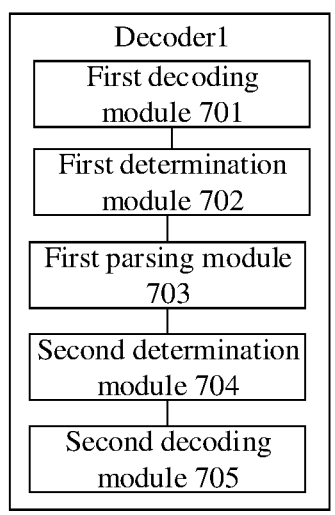
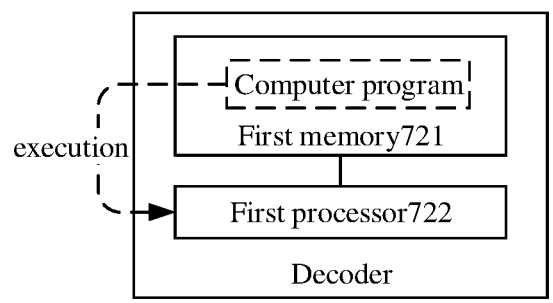
FIG. 7A
FIG. 7B

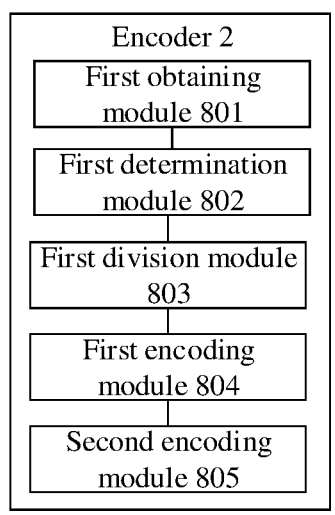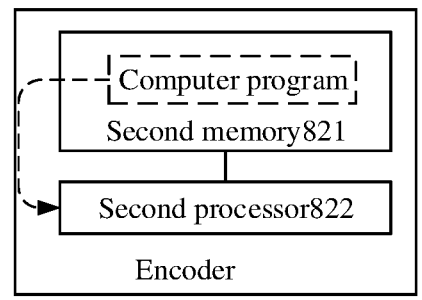
FIG. 8A
FIG. 8B

METHODS FOR LEVEL PARTITION OF POINT CLOUD, AND DECODER

CROSS-REFERENCE TO RELATED APPLICATION

This is a continuation of International Application No. PCT/CN2020/119707, filed on Sep. 30, 2020, entitled "POINT CLOUD LAYERING METHOD, DECODER, ENCODER, AND STORAGE MEDIUM", the disclosure of which is hereby incorporated by reference in its entirety.

BACKGROUND

In the related art, in a process of a level of detail (LOD) partition for an attribute of a point cloud, a user manually sets a number of levels for the LOD partition. In a generic test condition of a geometric-based point cloud compression (G-PCC) framework, the number of levels for the LOD partition is usually set to a large number.

SUMMARY

The present disclosure relates to the field of video coding, and relates to but not limited to methods for level partition of a point cloud, and a decoder, to solve at least one problem existing in the related art.

The solutions in the exemplary embodiments of the disclosure are implemented as follows.

In a first aspect, there is provided a method for level partition of a point cloud in an exemplary embodiment of the present disclosure. The method is applied to a decoder and includes the following operations.

A point cloud bitstream is decoded. The point cloud bitstream includes geometry information and attribute information of the point cloud.

A maximum permissible value of a first syntax element in the point cloud bitstream is determined.

The point cloud bitstream is parsed to determine a value of the first syntax element according to the maximum permissible value.

A number of levels of detail (LODs) in a process of decoding the attribute information is determined according to the value of the first syntax element.

The attribute information is decoded according to the number of the LODs and the geometry information, to determine a reconstructed point cloud of the point cloud.

In a second aspect, there is provided a method for level partition of a point cloud in an exemplary embodiment of the present disclosure. The method is applied to an encoder and includes the following operations.

Geometry information and attribute information of the point cloud are determined.

A maximum permissible value of a first syntax element is determined. The first syntax element represents a number of LODs in a process of encoding the attribute information of the point cloud.

LOD partition is performed on the point cloud according to the maximum permissible value and the geometry information of the point cloud, and a value of the first syntax element is determined.

The point cloud is encoded according to the LOD partition for the point cloud, to generate a bitstream.

The value of the first syntax element is encoded, and encoded bits are signaled into the bitstream.

In a third aspect, there is provided a decoder in an embodiment of the present disclosure. The decoder includes a processor and a memory storing a computer program executable on the processor.

The processor is configured to decode a point cloud bitstream. The point cloud bitstream includes geometry information and attribute information of a point cloud.

The processor is configured to determine a maximum permissible value of a first syntax element in the point cloud bitstream.

The processor is configured to parse the point cloud bitstream to determine a value of the first syntax element according to the maximum permissible value.

The processor is configured to determine, according to the value of the first syntax element, a number of LODs in a process of decoding the attribute information.

The processor is configured to decode the attribute information according to the number of the LODs and the geometry information, to determine a reconstructed point cloud of the point cloud.

BRIEF DESCRIPTION OF THE DRAWINGS

FIG. 7A is a schematic diagram of a hardware structure of a decoder according to an embodiment of the present disclosure.

FIG. 7B is a schematic diagram of a hardware structure of another decoder according to an embodiment of the present disclosure.

FIG. 8A is a schematic diagram of a hardware structure of an encoder according to an embodiment of the present disclosure.

FIG. 8B is a schematic diagram of a hardware structure of another encoder according to an embodiment of the present disclosure.

DETAILED DESCRIPTION

The solutions in the embodiments of the present disclosure will be described below clearly and completely with reference to the accompanying drawings in the embodiments of the present disclosure.

An exemplary embodiment of the present disclosure provides a method for level partition of a point cloud. The method is applied to a mobile device having a front camera function or a rear camera function. The mobile device may be implemented in various forms. For example, the mobile device in the exemplary embodiments of the present disclosure may include a mobile phone, a tablet, a palmtop, a personal digital assistant (PDA), and the like. In addition, a function implemented by the method may be implemented by a processor in the mobile device through calling a program code. The program code may be stored in a computer storage medium. Accordingly, the mobile device includes at least the processor and the storage medium.

In a generic test condition of a G-PCC framework, the number of levels for the LOD division is usually set to a large number, resulting in an inconsistency between a set value and an actual number of divided levels.

Figure 1A:
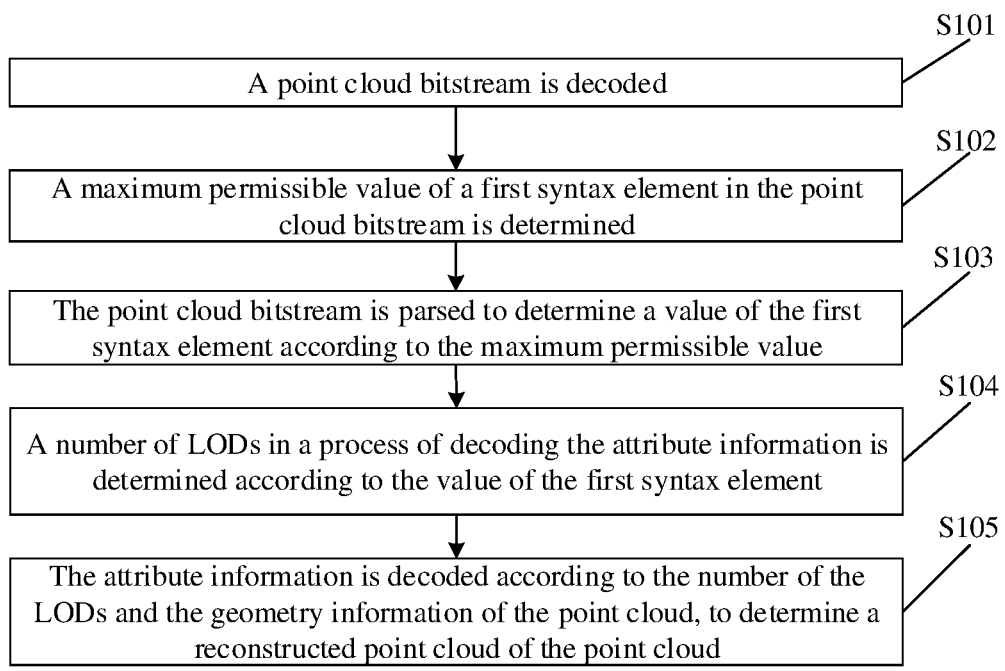
FIG. 1A is a schematic flowchart of an implementation of a method for level partition of a point cloud according to an exemplary embodiment of the present disclosure.

An embodiment of the present disclosure provides a method for level partition of a point cloud, and the method is applied to a video decoding device, i.e. a decoder. A functionality implemented by the method may be implemented by a processor in the video decoding device through calling a program code. The program code may be stored in a computer storage medium. Accordingly, the video decoding device includes at least the processor and the storage medium. FIG. 1A is a schematic flowchart of an implementation of a method for level partition of a point cloud according to an exemplary embodiment of the present disclosure. The method is described below with reference to FIG. 1A.

At operation S101, a point cloud bitstream is decoded.

The point cloud bitstream includes geometry information and attribute information of the point cloud. The point cloud bitstream may be understood as point cloud data that needs to be partitioned into levels, for example, point cloud data for forming a three-dimensional (3D) video. The level partition of the point cloud data may be implemented based on a Morton code or a sampling distance. At operation S101, the geometry information of the point cloud includes: a normal vector of the point cloud, a curvature, a density of the point cloud, a surface roughness of the point cloud, a center of gravity of the point cloud, a weighted center of gravity of the point cloud, a covariance of the point cloud, a cross-covariance of the point cloud, and the like. The attribute information includes: a square of a partition distance of an input point cloud, a total number of partitioned levels, color space information, spatial resolution, precision of point position, a normal vector of a surface, and the like.

In some possible implementations, a process of LOD partition of the point cloud data based on the Morton code is described as follows.

Firstly, let a variable $(P_i)_{i=1 \ldots N}$ store an original input point cloud, and let a variable $(M_i)_{i=1 \ldots N}$ be a Morton code associated with each point. Let D0 and $\rho$ be two user-defined initial parameters, which are used as parameters specifying a distance threshold for LOD partition, where $\rho>1$. A specific method for calculating the Morton code is described below. For a 3D coordinate, each component of the 3D coordinate may be represented by a d-bit binary number, and three components may be represented as a formula (1):

$$x = \sum_{l=1}^{d} 2^{d-l} x_l, \; y = \sum_{l=1}^{d} 2^{d-l} y_l, \; z = \sum_{l=1}^{d} 2^{d-l} z_l; \qquad (1)$$

where $x_l, y_l, z_l \in \{0,1\}$ are binary numbers of the x, y and z components from a high order (l=1) to a low order (l=d), respectively. The Morton code M is obtained by interleaving $x_l, y_l, z_l$ from a high order to a low order. The formula for calculating M is illustrated in the followin formula (2):

$$M = \sum_{l=1}^{d} 2^{3(d-l)}(4x_l + 2y_l + z_l) = \sum_{l'}^{3d} 2^{3d-l'} m_{l'}; \qquad (2)$$

where $m_{l'} \in \{0,1\}$ are bits of M from a high order (l'=1) to a low order (l'=3d). Points in the point cloud are sorted according to their associated Morton codes in an ascending order after obtaining the Morton code M of each point in the point cloud. Let a variable I store indexes of all points, and the algorithm proceeds iteratively. At the k-th iteration, points belonging to LODk may search for their nearest neighbors from LOD0 to LODk−1. A specific process of the algorithm proceeds as follows.

Firstly, a sampling distance D is initialized with D=D$_0$.

Then, for the k-th iteration, where k=0, 1 . . . N−1 (N is a total number of LODs), let a variable L(k) store points belonging to the k-th LOD, and let a variable O(k) store a set of points belonging to LODs higher than the LODk. L(k) and O(k) are computed as follows.

At a first step, O(k) and L(k) are initialized, where L(k) is initialized as an empty set and O(k) is initialized as an empty set.

At a second step, indexes of the points stored in the variable I are traversed for each iteration. For each traversal, distances from a current point to all points within a certain range in the set O(k) are calculated. A search is carried out in a search range SR1 in the set O(k) (SR1 is a search range based on a Morton order and could be chosen as 8, 16 or 64 generally) based on a Morton order corresponding to the current point. If a distance from the current point to a point in the search range is found to be lower than a threshold dl, then the current point is appended to the set L(k); otherwise, it is appended to the set O(k).

At a third step, for each iteration, the sets L(k) and O(k) are calculated separately, and the points in O(k) may be used as prediction points for the points in the set L(k), so as to realize the LOD partition of the point cloud data. It is assumed that a set R(k)=L(k)\L(k−1), where R(k) represents a set of different points between the set LOD(k−1) and the set LOD(k).

In another implementation, the LOD partition process of the point cloud data based on a sampling distance is described as follows.

The LOD is generated by partitioning the original input point cloud into different refinement levels $(R_l)_{l= \ldots L-1}$ based on a set of different distance thresholds $(d_l)_{l=0 \ldots L-1}$ specified by user. It is to be noted that the distance thresholds $(d_l)_{l=0 \ldots L-1}$ are required to satisfy the following two conditions:

$d_l < d_{l-1}$, and $d_{L-1} = 0$.

The LOD partition process is deterministic and operates after the geometric reconstruction of the point cloud, and the geometric coordinate information of the point cloud may be determined at this time. The LOD partition process is applied at both an encoding and a decoding side of the point cloud. The specific process of the LOD partition proceeds as follows.

1) Firstly, all points are marked as non-visited, and a set of visited points, denoted as V, is initialed as an empty set.
2) The process of the algorithm proceeds iteratively. At each iteration l, a refinement level $R_l$ is generated as follows.

At a first step, the algorithm iterates over all the points.

At a second step, if a current point has been visited, then it is ignored.

At a third step, otherwise, a nearest distance D of the current point to the set V is calculated.

At a fourth step, if the nearest distance D is greater than or equal to the threshold $d_l$, the point is added to the refinement levels $R_l$ and V.

At a fifth step, the process is iterated continuously until all points are traversed.

3) The l-th LOD, i.e., $LOD_l$, is determined by taking the union of the refinement levels $R_0, R_1, \ldots, R_l$.
4) The process is iterated continuously until all LODs are generated or until all points are traversed, thereby realizing the LOD partition of the point cloud data.

At operation S102, a maximum permissible value of a first syntax element in the point cloud bitstream is determined.

The maximum permissible value specifies a level of detail for the attribute encoding, which may be in a range of 0 to X, where X is a positive integer. The maximum permissible value for level partition of the point cloud bitstream may be determined based on a profile, a tier or a level of the point cloud bitstream. Alternatively, the maximum permissible value may be set to a constant, that is, the LOD partition of the point cloud bitstream is performed according to the constant.

At operation S103, the point cloud bitstream is parsed to determine a value of the first syntax element according to the maximum permissible value.

The point cloud bitstream is parsed to determine the maximum permissible value for level partition of the point cloud bitstream. Then, the value of the first syntax element may be determined from the maximum permissible values based on the profile, the tier or the level of the point cloud bitstream. Alternatively, the value of the first syntax element may be set to a constant, that is, the LOD partition of the point cloud bitstream is performed according to the constant.

In some possible implementations, the operation of determining the value of the first syntax element may be implemented in the following two manners.

In a first manner, the point cloud bitstream is parsed to determine a conformance parameter.

The conformance parameter characterizes the attribute of the point cloud bitstream itself, and includes at least one of: a profile, a tier or a level.

Then, the maximum permissible value is determined according to a preset correspondence between the conformance parameter and the maximum permissible value.

The correspondence between the conformance parameter and the maximum permissible value is preset and includes: a correspondence between the maximum permissible value and the profile, a correspondence between the maximum permissible value and the tier, and a correspondence between the maximum permissible value and the level. In a specific example, the tier is divided into three tiers: a high tier, a middle tier and a low tier. Different tiers are set to correspond to different maximum permissible values. The higher the tier, the greater the maximum permissible value. For example, the maximum permissible value corresponding to the high tier is 31, the maximum permissible value corresponding to the middle tier is 21, and the maximum permissible value corresponding to the low tier is 16. The correspondence between the profile and the maximum permissible value or the correspondence between the level and the maximum permissible value may also be set similarly. In such way, the maximum permissible value can be determined according to the correspondence between the conformance parameter and the maximum permissible value.

In a second manner, the maximum permissible value is set to a preset constant. The constant is an integer greater than 0.

In some possible implementations, the constant is an integer greater than 0 and less than or equal to a preset threshold. In a specific example, the preset threshold may be 31. In other examples, the preset threshold may be other values, such as 6, 7, 8, 16, 21, 32, 64, etc.

At operation S104, a number of LODs in a process of decoding the attribute information is determined according to the value of the first syntax element.

The number of the LODs in the process of decoding the attribute information may be determined as a value obtained by subtracting 1 from the value of the first syntax element.

In some embodiments, after determining the value of the first syntax element, a set of Morton codes of the point cloud bitstream is determined. In some possible implementations, firstly, the point cloud data (such as the point cloud data for forming the 3D video) to be searched is determined. Then, Morton codes of the point cloud data are determined. For example, a binary encoded data stream of the point cloud data may be determined, and then the Morton codes of the point cloud data may be determined according to the binary encoded data stream. Finally, the Morton codes of the point cloud data are arranged in an ascending order, to obtain the set of Morton codes including a plurality of Morton codes. Optionally, the Morton codes of the point cloud data may also be arranged in a descending order to obtain the set of Morton codes including a plurality of Morton codes. The Morton codes of the point cloud data may also be arranged in any specific order (for example, randomly, in order of decreasing from the middle maximum to the two ends, etc.), to obtain the set of Morton codes. Next, the value of the first syntax element is determined in a range formed by the maximum permissible value according to the set of Morton codes and the geometry information. Finally, the LOD partition is performed on the point cloud according to the value of the first syntax element.

At operation S105, the attribute information is decoded according to the number of the LODs and the geometry information of the point cloud, to determine a reconstructed point cloud of the point cloud.

The number of the LODs may be understood as the number of levels for LOD partition of the point cloud. The attribute information of the point cloud is decoded by considering the number of levels and the geometry information of the point cloud together, to reconstruct the point cloud. In some possible implementations, firstly, one or more reconstructed values for one or more LODs in the point cloud is(are) determined according to the number of the LODs and the geometry information of the point cloud. Then, the reconstructed point cloud of the point cloud is determined according to the one or more reconstructed values for the one or more LODs. For example, the LOD partition is performed on the point cloud according to the number of LODs and the geometry information of the point cloud, to determine the one or more reconstructed values for the one or more LODs. In an exemplary embodiment, when the point cloud is reconstructed by the decoder, position information of vertices of each of n slices and point cloud information corresponding to the n slices are parsed from the bitstream. Then, in point cloud model reconstruction, the point cloud model may be reconstructed according to the position information of the vertices of each of the n slices and the point cloud information corresponding to the n slices.

In an exemplary embodiment of the present disclosure, the maximum permissible value of the first syntax element is determined by determining the geometry information and the attribute information of the point cloud. Then, the value of the first syntax element is determined according to the maximum permissible value and the geometry information of the point cloud. Finally, the LOD partition is performed on the point cloud to encode the point cloud, the value of the first syntax element is encoded, and the encoded bits are signaled into the bitstream. In such way, the maximum permissible value of the point cloud data can be determined adaptively according to the geometry information and the attribute information of the point cloud data, thereby specifying a range of the value of the first syntax element for level partition of the point cloud data. Therefore, the number of levels of the LOD partition set by the user can be checked at both the encoder and the decoder, and a consistency between the number of levels set by the user and the actual number of levels can be increased.

In some embodiments, after determining the value of the first syntax element (i.e., at operation S103), the method further includes the following operations.

Firstly, a set of Morton codes of the point cloud bitstream is determined. In some possible implementations, firstly, point cloud data (such as the point cloud data for forming the 3D video) to be searched is determined. Then, Morton codes of the point cloud data are determined. For example, a binary encoded data stream of the point cloud data may be determined first, and then the Morton codes of the point cloud data may be determined according to the binary coded data stream. Finally, the Morton codes of the point cloud data are arranged in an ascending order, to obtain the set of Morton codes including a plurality of Morton codes. Optionally, the Morton codes of the point cloud data may also be arranged in a descending order to obtain the set of Morton codes including a plurality of Morton codes. The Morton codes of the point cloud data may also be arranged in any specific order (for example, randomly, in order of decreasing from the middle maximum to the two ends, etc.), to obtain the set of Morton codes. Next, the value of the first syntax element is determined in a range formed by the maximum permissible value according to the set of Morton codes and the geometry information. Finally, the LOD partition is performed on the point cloud according to the value of the first syntax element.

Figure 1B:
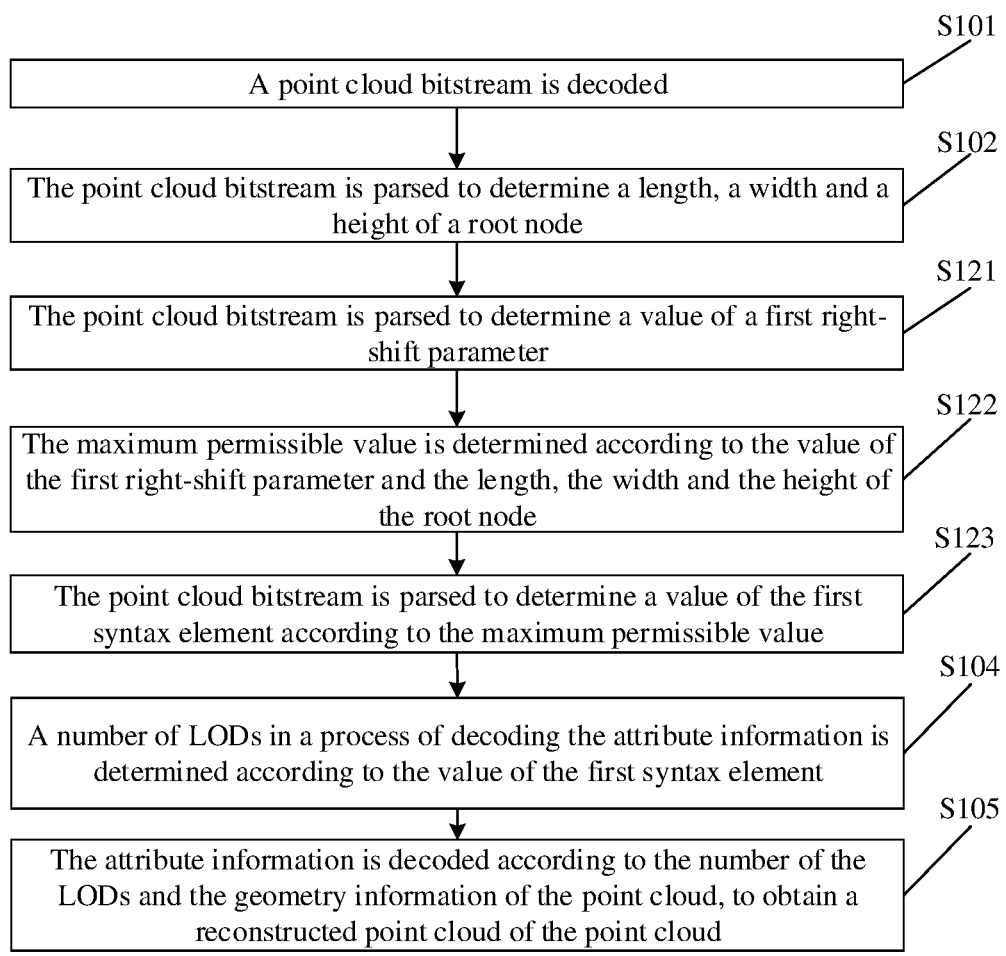
FIG. 1B is a schematic flowchart of another implementation of a method for level partition of a point cloud according to an exemplary embodiment of the present disclosure.

In some embodiments, when the LOD partition is performed based on the Morton code, the operation that the maximum permissible value for level partition of the point cloud data is determined adaptively according to the attribute information of the point cloud data, i.e., the operation S102, may be implemented through the following operations. FIG. 1B is a schematic flowchart of another implementation of a method for level partition of a point cloud according to an exemplary embodiment of the present disclosure, and is described as follows.

At operation S121, the point cloud bitstream is parsed to determine a length, a width and a height of a root node.

The root node is a deepest node in the point cloud, which may be represented by a bounding box.

In some possible implementations, the geometry information of the point cloud bitstream is parsed to determine the length, the width and the height of the root node. For example, unit header information in the geometry information is parsed to determine the length, the width and the height of the root node. Since the length, the width and the height of the root node are encoded and signaled into the unit header information in the geometry information (the unit header information may be expressed as geometry_data_unit_header ( )) at the encoder, the length, the width and the height of the root node may be determined by parsing the unit header information in the geometry information at the decoder. The encoder determines the bounding box of the point cloud according to the geometry information of the point cloud, determines the root node of the point cloud according to the bounding box, to determine the length, the width and the height of the root node of the point cloud, encodes the length, the width and the height of the root node of the point cloud into a bitstream and signals the bitstream into the unit header information.

At operation S122, the point cloud bitstream is parsed to determine a value of a first right-shift parameter.

The value of the first right-shift parameter (such as, an initial sampling distance input by the user) for level partition of the point cloud is determined according to the geometry information of the point cloud. In some possible implementations, the initial sampling distance of the point cloud is determined by parsing the point cloud bitstream, and the initial sampling distance is set as the value of the first right-shift parameter. The initial sampling distance may be set by the user or may be set according to the attribute information of the point cloud.

At operation S123, the maximum permissible value is determined according to the value of the first right-shift parameter and the length, the width and the height of the root node.

Regardless of the LOD partition of the point cloud data is performed based on the sampling distance or based on the Morton code, an N-th level for level partition of the point cloud data is determined by comprehensively considering the attribute information of the point cloud, and the maximum permissible value is set by determining a relationship between a size of a node of the N-th level and a target length.

In some possible implementations, the operation of determining the maximum permissible value for partition of the point cloud bitstream includes the following two implementations.

In a first implementation, the LOD partition of the point cloud data is performed based on the Morton code, and the operations of which are described as follows.

At a first operation, a maximum among the length, the width and the height of the root node is set as a maximum dimension of the root node.

Herein, the maximum (gbh.maxRootNodeDimLog2) of the length, the width and the height of the root node is set as the maximum dimension of the root node. The point cloud is processed with parameters in the attribute information, such as an initial partition distance, a total number of partitioned levels and a color space transformation of the point cloud, to determine a size of a node in the N-th level. When a difference between the size of the root node and the size of the node in the N-th level is relatively small or the size of the root node is equal to the size of the node in the N-th level, the number of levels at the N-th level is determined as the maximum permissible value.

In this operation, when the LOD partition is performed based on the Morton code, the maximum number of partitionable levels of the LOD partition is adaptively determined by comparing sizes between the node in the N-th level and the root node, and a range of a syntax element (lifting_num_detail_levels_minus1) is explicitly specified.

At a second operation, the point cloud bitstream is parsed to determine a value of a second right-shift parameter.

Herein, the value of the second right-shift parameter may be a value for fine-tuning the value of the first right-shift parameter. An initial sampling distance of each of blocks is determined by parsing the point cloud bitstream, and a sum of initial sampling distances of the blocks is calculated to determine a total initial sampling distance. The value of the second right-shift parameter is determined by subtracting the first right-shift parameter from the total initial sampling distance. In some possible implementations, in encoding of the point cloud data, firstly, the point cloud data is segmented into multiple blocks, then the initial sampling distance of each of the multiple blocks in the point cloud is determined from the geometry information, and a sum of the initial sampling distances of the multiple blocks is calculated to determine the total initial sampling distance. The difference between the total initial sampling distance and the first right-shift parameter is determined as the second right-shift parameter. Therefore, the second right-shift parameter can be understood as a value for fine-tuning the value of the first right-shift parameter.

At a third operation, a difference between the maximum dimension of the root node and a sum of the first right-shift parameter and the second right-shift parameter is determined as the maximum permissible value.

Herein, a sum of the first right-shift parameter and the second right-shift parameter is calculated, for example, calculation is performed on the point cloud according to an input initial partition distance and a total number of partitioned levels, to determine the total initial sampling distance. In an exemplary embodiment of the present disclosure, the second right-shift parameter abh.attr_dist2_delta is calculated from the first right-shift parameter aps.dist2 and the input point cloud, and then an initial number of right-shift bits shiftbits0 is calculated from aps.dist2 and abh.atttr_dist2_delta.

In some possible implementations, the maximum permissible value may be determined by the following operations.

At step A, a header file function of the attribute information is determined.

Herein, the point cloud data is processed according to an input parameter in the attribute information (for example, the initial partition distance, the total number of partitioned levels and the color space transformation parameter of the point cloud), to determine the header file function (for example, abh.atttr_dist2_delta). The header file function characterizes the attribute parameter of the point cloud data.

At step B, a sum of a value of the header file function and a parameter value corresponding to the attribute information is calculated to determine the total initial sampling distance.

Herein, a sum of a value of abh.atttr_dist2_delta (corresponding to the value of the second right-shift parameter) and the parameter value corresponding to the attribute information is determined as the initial number of right-shift bits. Thus, the point cloud data is processed according to the input attribute information to determine the initial number of right-shift bits for the partition of the point cloud.

At step C, the maximum permissible value is determined by subtracting the total initial sampling distance from the maximum dimension of the root node.

The step C may be implemented as follows.

At step C1, a node to which the N-th level for partition of the point cloud belongs is determined according to the total initial sampling distance, N being an integer greater than or equal to 2.

After the initial number of right-shift bits is determined, for each partition of the level, the initial number of right-shift bits is increased by 1 and a size of a corresponding leaf node is increased by 2 times. For example, the initial number of right-shift bits is shiftbits0, and the size of the corresponding node is $2^{shiftbits0}$. For each partition of the level, shiftbits0+1, and the size of the corresponding leaf node is increased to twice the node of a previous level. Therefore, when the partition is performed to the N-th level, the number of right-shift bits is: shiftbits=shiftbits0+(N−1), and the size of the node to which the N-th level belongs is $2^{N-1+shiftbits0}$.

In some possible implementations, the process for determining the node to which the N-th level belongs is described as follows.

Firstly, size information of a node to which an initial level for level partition of the point cloud bitstream belongs is determined according to the initial number of right-shift bits and a preset base.

The preset base is used as a base and the initial number of right-shift bits is used as an index, and the obtained result is determined as the size of the node to which the initial level for level partition of the point cloud bitstream belongs. For example, if 2 is used as the base and shiftbits0 is used as the initial number of right-shift bits, then the size of the node to which the initial level for level partition of the point cloud bitstream belongs is $2^{shiftbits0}$.

Secondly, a difference in the number of levels between the N-th level and the initial level is determined.

It is assumed that the initial level is the first level, and then the difference is N−1.

Thirdly, the size information of the node to which the initial level belongs is adjusted according to the difference, to obtain adjusted size information.

The initial number of right-shift bits is added with the difference to determine the number of right-shift bits of the N-th level. The size of the node to which the initial level belongs is adjusted by the number of right-shift bits of the N-th level, to obtain the adjusted size information. For example, if the difference is N−1, the number of right-shift bits of the N-th level is shiftbits0+(N−1), $2^{shiftbits0}$ is increased by $2^{N-1}$ times, and the adjusted size information is determined as $2^{N-1+shiftbits0}$.

Finally, the node to which the N-th level belongs is determined according to the adjusted size information.

The adjusted size information is determined as the size of the node to which the N-th level belongs. For example, $2^{N-1+shiftbits0}$ is determined as the size of the node to which the N-th level belongs.

At step C2, the maximum permissible value is determined according to the node to which the N-th level belongs and the root node.

The maximum number of levels is determined by comparing the size of the node to which the N-th level belongs with the size of the root node.

In some possible implementations, the operation that the maximum permissible value is determined according to the node to which the N-th level belongs and the root node may be implemented by the following actions.

Firstly, size information of the root node is determined.

The size information of the root node is a length of a longest side of the bounding box.

Secondly, a first difference between the adjusted size information and the size information of the root node is determined.

The adjusted size information is compared with the size information of the root node, and the first difference is determined by subtracting the adjusted size information from the size information of the root node. For example, if the adjusted size information is $2^{N-1+shifbits0}$ and the size information of the root node is $2^{maxRootNodeDimLog2}$, then the first difference is $2^{maxRootNodeDimLog2} - 2^{N-1+shifbits0}$.

Finally, if the first difference is less than or equal to a first preset threshold, the number of levels corresponding to the N-th level is determined as the maximum permissible value.

Herein, the first preset threshold is an integer close to 0. When the first difference is close to 0, it is indicated that the size of the node to which the N-th level belongs is very close to the size of the root node, which indicates that the number of levels corresponding to the N-th level is the maximum number of levels for level partition of the point cloud bitstream. Therefore, the number of levels corresponding to the N-th level, where the size of the node to which it belongs is very close to that of the root node, is determined as the maximum permissible value. As such, a range of a syntax element lifting_num_detail_levels_minus1 can be adaptively set according to the attribute information of the point cloud.

In the first implementation, the point cloud data is processed by using an attribute parameter set of the input point cloud, so as to determine the initial number of right-shift bits of the point cloud. The size of the node corresponding to the initial partitioned level is determined based on the initial number of right-shift bits. Then, for each partition of the level, the initial number of right-shift bits is increased and the size of the node corresponding to the level is also increased, so that the number of right-shift bits of the N-th level and the size of the node corresponding to the N-th level can be determined. Finally, the maximum permissible value is determined by comparing the size of the node corresponding to the N-th level with the target length.

In a second implementation, the LOD partition of the point cloud is performed based on the sampling distance. Firstly, a sampling distance of the N-th level is determined by combining the initial sampling distance in the attribute information and a ratio between sampling distances of two adjacent levels. Then, the maximum permissible value is determined by comparing the sampling distance of the N-th level and the target length. The process may be implemented as follows.

At step A, a diagonal distance of a root node is determined according to a length, a width and a height of the root node.

A length of a longest diagonal of a bounding box is determined as the target length. Lengths of three sides perpendicular to each other in the bounding box are determined according to a size of the root node in the attribute information of the point cloud bitstream, and a distance between two farthest vertices in the bounding box, i.e. the length of the longest diagonal is determined according to the lengths of the three sides, to determine the target length. In a specific example, the size of the root node is $2^{maxRootNodeDimLog2}$, and the lengths of the three sides are $2^{gbh.rootNodeSizeLog2[k]}$ (k=0, 1, 2), respectively.

At step B, the maximum permissible value is determined according to the diagonal distance of the root node and the value of the first right-shift parameter.

In some possible implementations, the step B may be implemented by the following steps.

At step B1, a first ratio is determined.

Herein, the first ratio is a ratio between the diagonal distance of the root node and an arithmetic square root of the value of the first right-shift parameter, for example, a ratio between the sampling distances of a first level and a second level. In an exemplary embodiment of the present disclosure, a ratio between sampling distances of each two adjacent levels may be set to be the same, for example, may be set to P. In other embodiments, the ratio between the sampling distances of each two adjacent levels may also be set to be different.

At step B2, a logarithm value of the first ratio is determined.

The logarithm value of the first ratio can be understood as the sampling distance of the N-th level, and the sampling distance of the N-th level may be determined according to the length of the longest diagonal of the bounding box and the first ratio. For example, a sampling distance of a next level may be determined by multiplying the initial sampling distance by the first ratio, and so on until the sampling distance of the N-th level is determined.

In some possible implementations, the first ratio between sampling distances of adjacent LODs is determined by parsing the point cloud bitstream, and the first ratio is set according to sparseness of point cloud coordinates in the geometry information of the point cloud. The first ratio may be set to a number greater than 1, to ensure that collection of the point cloud is sparser level by level as the number of levels increases during the level partition of the point cloud.

At step B3, the logarithm value is determined as the maximum permissible value.

A ratio between the sampling distances of the adjacent LODs is determined as the base corresponding to the logarithm value. In some embodiments, the sampling distance of the N-th level is compared with the length of the longest diagonal of the bounding box. If the sampling distance of the N-th level is very close to the length of the longest diagonal of the bounding box, it is indicated that the N-th level is a last level for level partition of the point cloud, that is, the number of levels corresponding to the N-th level is the maximum permissible value.

In some exemplary embodiments, when the LOD partition is performed based on the distance, the maximum permissible value may be set based on the longest diagonal of the bounding box, which may be implemented as follows.

At a first operation, lengths of three sides perpendicular to each other in the bounding box are determined.

If the bounding box is a cube, the three sides perpendicular to each other in the bounding box can be understood as a length, a width and a height of the cube.

At a second operation, a length of the longest diagonal is determined according to the lengths of the three sides.

It is assumed that the lengths of the three sides are $2^{gbh.rootNodeSizeLog2[k]}$ (k=0, 1, 2), respectively. According to Pythagorean theorem, the length of the longest diagonal is $$\sqrt{\sum_{k=0}^{2}(2^{gbh.rootNodeSizeLog2[k]})^2}.$$

According to the first operation and the second operation, when the LOD partition is performed based on the distance, the length of the longest diagonal is determined based on the lengths of the three perpendicular sides of the bounding box, and the target length for setting the maximum permissible value can be determined.

In some exemplary embodiments, in a case that the LOD partition is performed based on the distance, the sampling distance of the N-th level may be determined according to the sampling distances of two adjacent levels and the ratio between the sampling distances, which may be implemented as follows.

At a first operation, sampling distances of at least two sets of adjacent levels are determined to determine a sampling distance set.

Sampling distances of multiple sets of adjacent levels are determined by analyzing an initial sampling distance and a total number of sampling levels in the attribute information. For example, sampling distances of a first level and a second level, sampling distances of a third level and a fourth level, sampling distances of a fifth level and a sixth level, etc., are determined respectively, to form the sampling distance set. In other words, the sampling distance set includes the sampling distances of multiple sets of adjacent levels.

At a second operation, a ratio between the sampling distances of two adjacent levels in the sampling distance set is determined, to determine a preset sampling distance ratio.

The ratio between the sampling distances of two adjacent levels in the sampling distance set is calculated. In an exemplary embodiment of the present disclosure, a ratio between the sampling distances of each two adjacent levels is the same, and the same ratio is determined as the preset sampling distance ratio. The preset sampling distance ratio may be determined by calculating the ratio between the sampling distances of two adjacent levels, or may be set in advance.

At a third operation, the sampling distance of the N-th level is determined according to the preset sampling distance ratio and the initial sampling distance in the attribute information.

Firstly, a difference in the number of levels between the N-th level and a level corresponding to the initial sampling distance in the attribute information is determined. Then, the n-th power (n is equal to the difference) of the preset sampling distance ratio is determined. Finally, the resulting product is multiplied by the target length to determine the sampling distance of the N-th level. For example, if the difference in the number of levels between the N-th level and the level corresponding to the initial sampling distance is N−1 and the preset sampling distance ratio is P, then the sampling distance of the N-th level is $P^{N-1} D_l$.

In an exemplary embodiment of the present disclosure, the sampling distance ratio is determined by determining the sampling distances of two adjacent levels in the attribute information, and the sampling distance of the N-th level is determined by combining the sampling distance ratio and the initial sampling distance. Thus, when the LOD partition is performed based on the distance, the sampling distance of each level may be determined, so as to set the maximum permissible value.

In some exemplary embodiments, in a case that the LOD partition is performed based on the distance, the maximum permissible value may be set by comparing the sampling distance of the N-th level with the target length, which may be implemented as follows.

At a first operation, a second difference between the sampling distance of the N-th level and the target length is determined.

Herein, a difference between the sampling distance of the N-th level and the longest diagonal of the bounding box is determined as the second difference. For example, the sampling distance of the N-th level is $P^{N-1}D_l$, the longest diagonal of the bounding box is $$\sqrt{\sum_{k=0}^{2}(2^{gbh.rootNodeSizeLog2[k]})^2},$$

and the second difference is $$\sqrt{\sum_{k=0}^{2}(2^{gbh.rootNodeSizeLog2[k]})^2} - P^{N-1}D_1.$$

At a second operation, if the second difference is less than or equal to a second preset threshold, the number of levels corresponding to the N-th level is determined as the maximum permissible value.

Herein, the second preset threshold is a positive number close to 0 and may be the same as or different from the first preset threshold. If the second difference is less than or equal to the second preset threshold, it is indicated that the sampling distance of the N-th level is very close to the length of the longest diagonal of the bounding box, which further indicates that the N-th level is a last level for level partition of the point cloud bitstream. Therefore, the number of levels corresponding to the N-th level may be determined as the maximum permissible value.

In the second implementation, firstly, in response to receiving a setting instruction, the value of the first syntax element is determined within a range formed by the maximum permissible value. Specifically, when the instruction for setting the number of levels input by the user is received, a number may be selected from the range formed by the maximum permissible value and used as the value of the first syntax element. For example, if the range formed by the maximum permissible value is [0, 20], then 18 may be selected as the value of the first syntax element. Partition of the point cloud is performed according to the value of the first syntax element. In such way, in the exemplary embodiment of the present disclosure, the maximum number of partitionable levels of the point cloud data can be adaptively determined according to the geometry information and the attribute information of the point cloud data, thereby specifying the maximum permissible value for level partition of the point cloud data. Therefore, the number of levels for the LOD partition set by the user can be checked at both the encoding side and the decoding side, and a consistency between the number of levels set by the user and the actual number of levels can be increased.

In some exemplary embodiments, after the maximum permissible value for level partition of the point cloud data is set, the number of levels for the LOD partition set by the user may be checked at both the encoding side and the decoding side, to increase consistency of a system. After the point cloud bitstream is partitioned according to the maximum permissible value, the method further includes the following operations.

At a first operation, a preset number of levels for level partition of the point cloud is determined.

The preset number of levels for level partition of the point cloud bitstream inputted by the user may be determined when the user performs level partition on the point cloud at the encoding side or the decoding side. For example, the preset number of levels for level partition of the point cloud bitstream set by the user is 30.

At a second operation, validity of the preset number of levels is determined according to the maximum permissible value.

It is determined whether the preset number of levels is within the range formed by the maximum permissible value. In response to the preset number of levels being within the range formed by the maximum permissible value, the preset number of levels is determined to be valid, that is, the preset number of levels is available. In response to the preset number of levels not within the range formed by the maximum permissible value, the preset number of levels is determined to be invalid, that is, the preset number of levels is unavailable. In a specific example, if the preset number of levels is 30 and the maximum permissible value is 21, the preset number of levels is invalid.

At a third operation, if the validity of the preset number of levels indicates that the preset number of levels is less than or equal to the maximum permissible value, the level partition is performed on the point cloud according to the preset number of levels.

Herein, if the preset number of levels is less than or equal to the maximum permissible value, i.e., the preset number of levels is within the range formed by the maximum permissible value, it is indicated that the preset number of levels is available, and the level partition can be performed on the point cloud according to the preset number of levels. Thus, the number of levels for the LOD partition set by the user can be checked at both the encoding side and the decoding side, and the consistency between the desired number of levels for the LOD partition set by the user and the actual number of levels in the LOD partition can be increased.

Figure 2A:
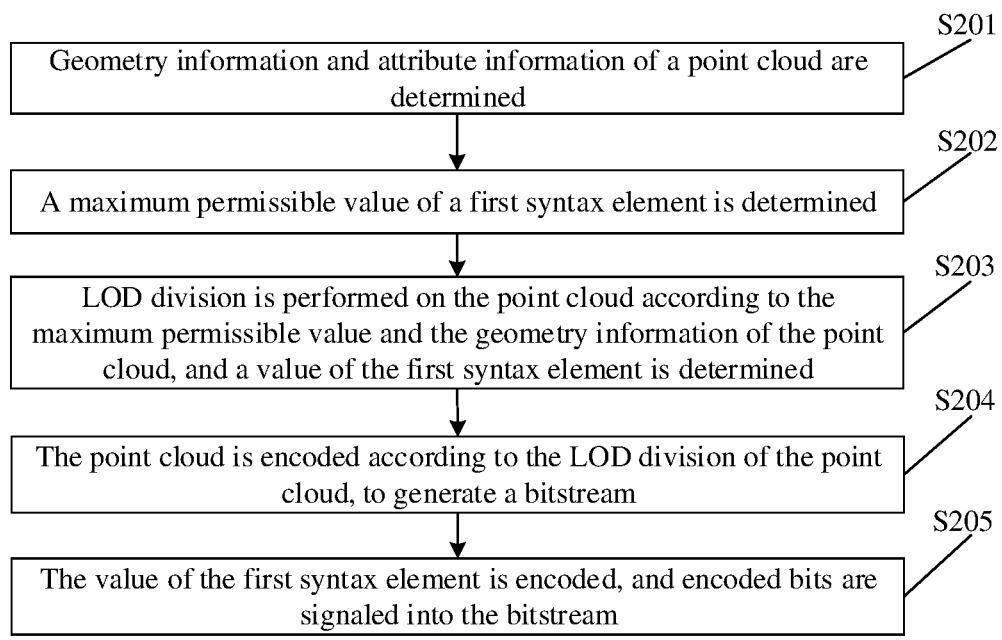
FIG. 2A is a schematic flowchart of an implementation of a method for level partition of a point cloud according to an exemplary embodiment of the present disclosure.

An embodiment of the present disclosure provides a method for level partition of a point cloud, and the method is applied to a video encoding device, i.e. an encoder. A function implemented by the method may be implemented by a processor in the video encoding device through calling a program code. The program code may be stored in a computer storage medium. Accordingly, the video encoding device includes at least the processor and the storage medium. FIG. 2A is a schematic flowchart of an implementation of a method for level partition of a point cloud according to an exemplary embodiment of the present disclosure. As illustrated in FIG. 2A, the method includes the following operations.

At operation S201, geometry information and attribute information of the point cloud are determined.

The point cloud bitstream may be understood as point cloud data (such as point cloud data for forming a 3D video) that needs to be partitioned into levels. The level partition of the point cloud data may be implemented according to a Morton code or a sampling distance. At operation S101, the geometry information of the point cloud includes: a normal vector of the point cloud, a curvature, a density of the point cloud, a surface roughness of the point cloud, a center of gravity of the point cloud, a weighted center of gravity of the point cloud, a covariance of the point cloud, a cross-covariance of the point cloud, and the like. The attribute information includes: a square of a partition distance of an input point cloud, a total number of partitioned levels, color space information, spatial resolution, precision of a point position, a normal vector of a surface, and the like.

In some possible implementations, a process of LOD partition of the point cloud data based on the Morton code is described as follows.

Firstly, let a variable $(P_i)_{i=1 \ldots N}$ store an original input point cloud, and let a variable $(M_i)_{i=1 \ldots N}$ be a Morton code associated with each point. Let D0 and ρ be two user-defined initial parameters, which are used as parameters specifying a distance threshold for LOD partition, where ρ>1. A specific method for calculating the Morton code is described below. For a 3D coordinate, each component of the 3D coordinate may be represented by a d-bit binary number, and three components may be represented in the above formula (1).

The Morton code M is obtained by interleaving $x_l$, $y_l$, $z_l$ from a high order to a low order. The formula for calculating M is illustrated in the above formula (2).

Points in the point cloud are sorted according to their associated Morton codes in an ascending order after obtaining the Morton code M of each point in the point cloud. Let a variable I store indexes of all points, and the algorithm proceeds iteratively. At the k-th iteration, points belonging to LODk may search for their nearest neighbors from LOD0 to LODk−1. A specific process of the algorithm proceeds as follows.

Firstly, a sampling distance D is initialized with D=D$_0$.

Then, for the k-th iteration, where k=0, 1 . . . N−1 (N is a total number of LODs), let a variable L(k) store points belonging to the k-th LOD, and let a variable O(k) store a set of points belonging to LODs higher than the LODk. L(k) and O(k) are computed as follows.

At a first step, O(k) and L(k) are initialized, where L(k) is initialized as an empty set and O(k) is initialized as an empty set.

At a second step, indexes of the points stored in the variable I are traversed for each iteration. For each traversal, distances from a current point to all points within a certain range in the set O(k) are calculated. A search is carried out in a search range SR1 in the set O(k) (SR1 is a search range based on a Morton order and could be chosen as 8, 16 or 64 generally) based on a Morton order corresponding to the current point. If a distance from the current point to a point in the search range is found to be lower than a threshold dl, then the current point is appended to the set L(k); otherwise, it is appended to the set O(k).

At a third step, for each iteration, the sets L(k) and O(k) are calculated separately, and the points in O(k) may be used as prediction points for the points in the set L(k), so as to realize the LOD partition of the point cloud data. It is assumed that a set R(k)=L(k)\L(k−1), where R(k) represents a set of different points between the set LOD(k−1) and the set LOD(k).

In another implementation, the LOD partition process of the point cloud data based on a sampling distance is described as follows.

The LOD is generated by partitioning the original input point cloud into different refinement levels $(R_l)_{l=0 \ldots L-1}$ based on a set of different distance thresholds $(d_l)_{l=0 \ldots L-1}$ specified by the user. It is to be noted that the distance thresholds $(d_l)_{l=0...L-1}$ are required to satisfy the following two conditions:

$$d_l < d_{l-1}, \text{ and}$$

$$d_{L-1} = 0$$

The LOD partition process is deterministic and operates after the geometric reconstruction of the point cloud, and the geometric coordinate information of the point cloud may be determined at this time. The LOD partition process is applied at both an encoding side and a decoding side of the point cloud. The specific process of the LOD partition proceeds as follows.

1) Firstly, all points are marked as non-visited, and a set of visited points, denoted as V, is initialed as an empty set.
2) The process of the algorithm proceeds iteratively. At each iteration l, a refinement level $R_l$ is generated as follows.

At a first step, the algorithm iterates over all the points.

At a second step, if a current point has been visited, then it is ignored.

At a third step, otherwise, a nearest distance D of the current point to the set V is calculated.

At a fourth step, if the nearest distance D is greater than or equal to the threshold $d_l$, the point is added to the refinement levels $R_l$ and V.

At a fifth step, the process is iterated continuously until all points are traversed.

3) The l-th LOD, i.e., $LOD_l$, is determined by taking the union of the refinement levels $R_0, R_1, \ldots, R_l$.
4) The process is iterated continuously until all LODs are generated or until all points are traversed, thereby realizing the LOD partition of the point cloud data.

At operation S202, a maximum permissible value of a first syntax element is determined.

The first syntax element represents a number of LODs in a process of encoding the attribute information of the point cloud. The maximum permissible value for level partition of the point cloud bitstream may be determined based on a profile, a tier or a level of the point cloud bitstream. Alternatively, the maximum permissible value may be set to a constant, that is, the LOD partition of the point cloud bitstream is performed according to the constant.

In some possible implementations, the process of determining the maximum permissible value may be implemented in the following two manners.

At a first manner, firstly, a conformance parameter is determined.

The conformance parameter characterizes the attribute of the point cloud bitstream itself, and includes at least one of: a profile, a tier or a level. In some possible implementations, the conformance parameter may be set according to a configuration parameter of the encoder. For example, if a level in the configuration parameter of the encoder is high, then a level in the conformance parameter is set to high. Similarly, a profile in the configuration parameter in the encoder may be set as a profile in the conformance parameter, or a tier in the configuration parameter in the encoder is set as a tier in the conformance parameter. The conformance parameter may also be determined according to a parameter determined in a session negotiation process. For example, if the level is determined to be high during the session negotiation, then the level in the conformance parameter is set to be high.

Then, the maximum permissible value is determined according to a preset correspondence between the conformance parameter and the maximum permissible value.

The correspondence between the conformance parameter and the maximum permissible value is preset and includes: a correspondence between the maximum permissible value and the profile, a correspondence between the maximum permissible value and the tier, and a correspondence between the maximum permissible value and the level. In a specific example, the tier is divided into three tiers: a high tier, a middle tier and a low tier. Different tiers are set to correspond to different maximum permissible values. The higher the tier, the greater the maximum permissible value. For example, the maximum permissible value corresponding to the high tier is 31, the maximum permissible value corresponding to the middle tier is 21, and the maximum permissible value corresponding to the low tier is 16. The correspondence between the profile and the maximum permissible value or the correspondence between the level and the maximum permissible value may also be set similarly. In such way, the maximum permissible value can be determined according to the correspondence between the conformance parameter and the maximum permissible value.

Finally, the conformance parameter is encoded and encoded bits are signaled into the bitstream.

At a second manner, the maximum permissible value is set to a preset constant. The constant is an integer greater than 0.

In some possible implementations, the constant is an integer greater than 0 and less than or equal to a preset threshold. In a specific example, the preset threshold may be 31. In other examples, the constant may be set according to the configuration parameters of the encoder, and the constant may also be set as an intrinsic parameter of the encoder itself. The preset threshold may also be other values, such as 6, 7, 8, 16, 21, 32, 64, etc.

At operation S203, LOD partition is performed on the point cloud according to the maximum permissible value and the geometry information of the point cloud, and a value of the first syntax element is determined.

The value of the first syntax element is not greater than the maximum permissible value. After the maximum permissible value is determined, the point cloud may be partitioned into LODs by comprehensively considering the geometry information of the point cloud, so as to determine the value of the first syntax element within a range formed by the maximum permissible value.

In some possible implementations, after determining the value of the first syntax element, a set of Morton codes of the point cloud bitstream is determined. In some possible implementations, firstly, point cloud data (such as the point cloud data for forming the 3D video) to be searched is determined. Then, Morton codes of the point cloud data are determined. For example, a binary encoded data stream of the point cloud data may be determined, and then the Morton codes of the point cloud data may be determined according to the binary coded data stream. Finally, the Morton codes of the point cloud data are arranged in an ascending order, to obtain the set of Morton codes including a plurality of Morton codes. In another embodiment, the Morton codes of the point cloud data may also be arranged in a descending order to obtain the set of Morton codes including a plurality of Morton codes. Optionally, the Morton codes of the point cloud data may also be arranged in any specific order (for example, randomly, in order of decreasing from the middle maximum to the two ends, etc.), to obtain the set of Morton cods. Next, the value of the first syntax element is determined in a range formed by the maximum permissible value according to the set of Morton codes and the geometry information. Finally, the LOD partition is performed on the point cloud according to the value of the first syntax element.

At operation S204, the point cloud is encoded according to the LOD partition of the point cloud, to generate a bitstream.

The point cloud at each level is encoded according to a LOD partition situation of the point cloud.

At operation S205, the value of the first syntax element is encoded, and encoded bits are signaled into the bitstream.

Herein, after determining the value of the first syntax element, a number of bits N occupied by the value in the bitstream is determined. In some possible implementations, the number of bits N in the bitsteam, corresponding to the first syntax element, is set to a minimum number of bits required for representing the maximum permissible value using an unsigned binary number. For example, the minimum number of bits required for representing the maximum permissible value using an unsigned binary number is 64, and the number of bits N in the bitsteam, corresponding to the first syntax element, is set to 64. Then, the value of the first syntax element is converted into N bits, that is, the value of the first syntax element is converted into bits corresponding to the N-bit unsigned binary number, and N bits are signaled into the bitstream. In such way, the value of the first syntax element is encoded and the encoded bits are signaled into the bitstream.

In an exemplary embodiment of the present disclosure, the geometry information and the attribute information of the point cloud are determined, and the maximum permissible value of the first syntax element is determined. Then, the value of the first syntax element is determined according to the maximum permissible value and the geometry information of the point cloud. Finally, the LOD partition is performed on the point cloud and the point cloud is encoded, the value of the first syntax element is encoded, and the encoded bits are signaled into the bitstream. In such way, the maximum permissible value for the point cloud data can be adaptively determined according to the geometry information and the attribute information of the point cloud data, thereby specifying a range of the value of the first syntax element for level partition of the point cloud data. Therefore, the number of levels of the LOD partition set by the user can be checked at both the encoding side and the decoding side, and a consistency between the number of levels set by the user and the actual number of levels can be increased.

Figure 2B:
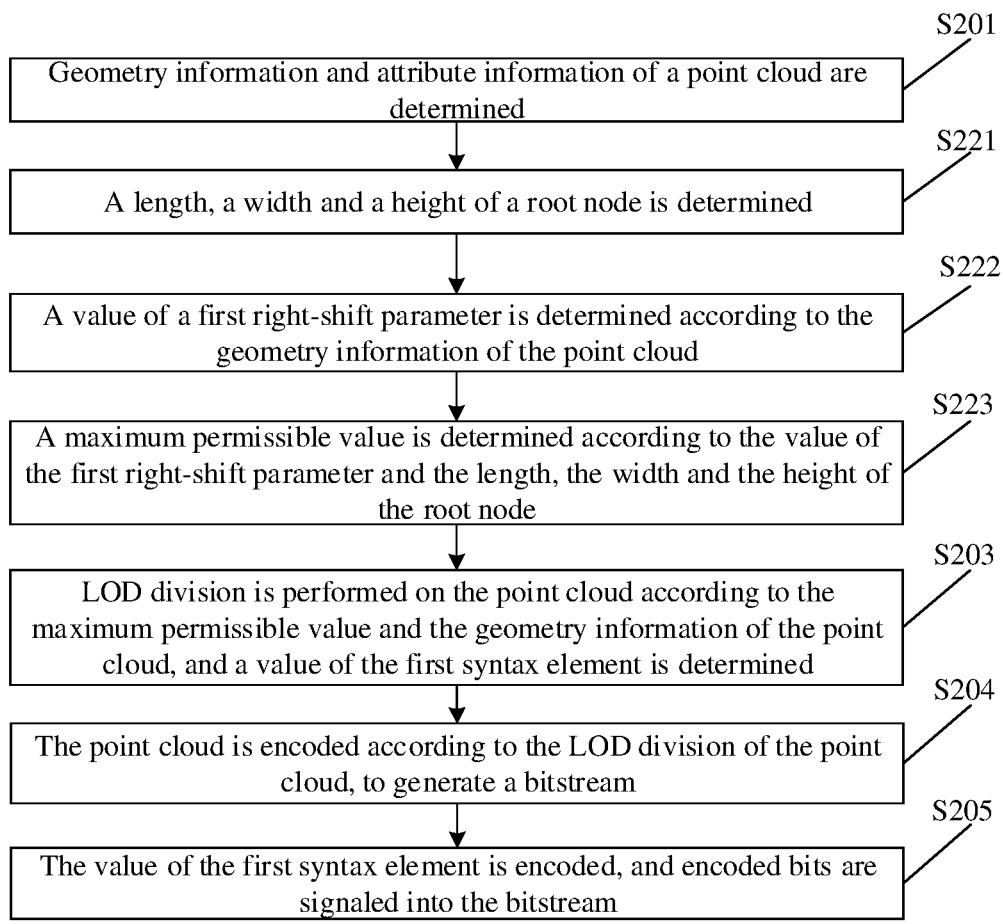
FIG. 2B is a schematic flowchart of another implementation of a method for level partition of a point cloud according to an exemplary embodiment of the present disclosure.

In some embodiments, when the LOD partition is performed based on the Morton code, the operation that the maximum permissible value for level partition of the point cloud data is adaptively determined according to the attribute information of the point cloud data, i.e., the operation S202, may be implemented by the following operations. FIG. 2B is a schematic flowchart of another implementation of a method for level partition of a point cloud according to an exemplary embodiment of the present disclosure, which is described as follows.

At operation S221, a length, a width and a height of a root node is determined.

The root node is a deepest node in the point cloud, which may be represented by a bounding box.

In some possible implementations, the operation may be implemented as follows.

At a first operation, the bounding box of the point cloud is determined according to the geometry information of the point cloud.

Herein, coordinate information of the point cloud may be determined by encoding the geometry information of the point cloud data, such as the point cloud normal vector, the curvature, the density of the point cloud, the surface roughness of the point cloud, the center of gravity of the point cloud, the weighted center of gravity of the point cloud, the covariance of the point cloud, the cross-covariance of the point cloud. Then, a size of a cube surrounding the point cloud data may be determined according to the coordinate information, thereby determining dimensions of the bounding box. The dimensions of the bounding box include a length, a width, a height and a diagonal length of the bounding box.

At a second operation, the root node of the point cloud is determined according to the bounding box, to determine the length, the width and the height of the root node of the point cloud.

Firstly, a target length that satisfies a preset condition is determined from the dimensions of the bounding box. For example, a length of a longest side of the bounding box is determined as the target length. The preset condition may be a longest dimension that matches a current manner for level partition of the point cloud. For example, when the LOD partition is performed on the point cloud data based on the sampling distance, the preset condition is a longest diagonal in the bounding box, i.e., a connecting line between two farthest vertices in the bounding box. When the LOD partition is performed on the point cloud data based on the Morton code, the preset condition is a longest side of bounding box, and the length of this side is taken as the length of the root node of the point cloud bitstream.

Then, the root node of the point cloud is generated according to the target length. Herein, the target length is the length of the longest side of the bounding box, a cube is constructed based on the longest side and is used as the root node of the point cloud, i.e., a largest node in the point cloud. For example, the length of the longest side of the bounding box is $2^{maxRootNodeDimLog2}$, and the size of the root node is also $2^{maxRootNodeDimLog2}$. After determining the size of the bounding box, the cube, which is constructed according to the longest side of the bounding box, is determined as the root node of the point cloud, so as to determine the largest node used for level partition of the point cloud.

At operation S222, a value of a first right-shift parameter is determined according to the geometry information of the point cloud.

The value of the first right-shift parameter (such as an initial sampling distance input by the user) for level partition of the point cloud is determined according to the geometry information of the point cloud. In some possible implementations, the initial sampling distance of the point cloud is determined from the geometry information, and the initial sampling distance is set as the value of the first right-shift parameter. The initial sampling distance may be set by the user or may be set according to the attribute information of the point cloud.

At operation S223, the maximum permissible value is determined according to the value of the first right-shift parameter and the length, the width and the height of the root node.

Regardless of the LOD partition of the point cloud data is implemented based on the sampling distance or the Morton code, an N-th level for level partition of the point cloud data is determined by comprehensively considering the attribute information of the point cloud, and the maximum permissible value is set by determining a relationship between a size of a node of the N-th level and a target length.

In some possible implementations, the operation of determining the maximum permissible value for partition of the point cloud includes the following two implementations.

In a first implementation, the LOD partition of the point cloud data is performed based on the Morton code, the operations of which are described as follows.

At a first operation, a maximum among the length, the width and the height of the root node is set as a maximum dimension of a root node.

The point cloud is processed with parameters in the attribute information, such as an initial partition distance, a total number of partitioned levels and a color space transformation, so as to determine a size of a node of the N-th level. When a difference between the size of the root node and the size of the node of the N-th level is small or the size of the root node is equal to the size of the node of the N-th level, the number of levels of the N-th level is determined as the maximum permissible value.

In this operation, when the LOD partition is performed based on the Morton code, the maximum number of partitionable levels of the LOD partition is adaptively determined by comparing sizes between the node of N-th level and the root node, thus a range of a syntax element lifting_num_detail_levels_minus1 is explicitly specified.

At a second operation, a value of a second right-shift parameter is determined according to the geometry information of the point cloud.

Herein, the value of the second right-shift parameter may be a value for fine-tuning the value of the first right-shift parameter. The initial sampling distance of each of blocks is determined after segmenting the input point cloud into a plurality of blocks, and a sum of the initial sampling distances of the blocks are calculated to determine a total initial sampling distance. Then the value of the second right-shift parameter is determined by subtracting the first right-shift parameter from the total initial sampling distance. In some possible implementations, when the point cloud data is encoded, the point cloud data is firstly segmented into several blocks, then, the initial sampling distance of each of the blocks of the point cloud is determined from the geometry information, and a sum of the initial sampling distances of the several blocks are calculated to determine the total initial sampling distance. The difference between the total initial sampling distance and the first right-shift parameter is determined as the second right-shift parameter. Therefore, the second right-shift parameter can be understood to be a value for fine-tuning the value of the first right-shift parameter.

At a third operation, a difference between the maximum dimension of the root node and a sum of the first right-shift parameter and the second right-shift parameter is determined as the maximum permissible value.

Herein, a sum of the first right-shift parameter and the second right-shift parameter is calculated. For example, calculation of the point cloud is performed according to an input initial partition distance and a total number of partitioned levels, to determine the total initial sampling distance. In an exemplary embodiment of the present disclosure, a second right-shift parameter abh.atttr_dist2_delta is calculated from a first right-shift parameter aps.dist2 and the input point cloud, and then an initial number of right-shift bits shiftbits0 is calculated from aps.dist2 and abh.atttr_dist2_delta.

In some possible implementations, the maximum permissible value may be determined by the following steps.

At step A, a header file function of the attribute information is determined.

Herein, the point cloud data is processed according to an input parameter in the attribute information (for example, the initial partition distance, the total number of partitioned levels and the color space transformation) to determine the header file function (for example, abh.atttr_dist2_delta). The header file function characterizes the attribute parameter of the point cloud data.

At step B, a sum of a value of the header file function and a parameter value corresponding to the attribute information is calculated to determine the total initial sampling distance.

Herein, a sum of a value of abh.atttr_dist2_delta (corresponding to the value of the second right-shift parameter) and the parameter value corresponding to the attribute information is determined as the initial number of right-shift bits. Thus, the point cloud data is processed according to the input attribute information to determine the initial number of right-shift bits in partition of the point cloud.

At step C, the total initial sampling distance is subtracted from the maximum dimension of the root node to determine the maximum permissible value.

The step C may be implemented by the following steps.

At step C1, a node to which the N-th level for partition of the point cloud belongs is determined according to the total initial sampling distance, N being an integer greater than or equal to 2.

After the initial number of right-shift bits is determined, for each partition of the level, the initial number of right-shift bits is increased by 1 and a size of a corresponding leaf node is increased by 2 times. For example, the initial number of right-shift bits is shiftbits0, and the size of the corresponding node is $2^{shifbits0}$. For each partition of the level, shiftbits0+1, and the corresponding leaf node is increased to twice of a node of a previous level. Therefore, when the partition is performed to the N-th level, the number of right-shift bits shiftbits=shiftbits0+(N−1), and the size of the node to which the N-th level belongs is $2^{N-1+shifbits0}$.

In some possible implementations, the process for determining the node to which the N-th level belongs is described as follows.

Firstly, size information of a node to which an initial level for level partition of the point cloud bitstream belongs is determined according to the initial number of right-shift bits and a preset base.

The preset base is used as a base and the initial number of right-shift bits is used as an index, and the obtained result is determined as the size of the node to which the initial level for level partition of the point cloud bitstream belongs. For example, if 2 is used as the base and shiftbits0 is used as the initial number of right-shift bits, then the size of the node to which the initial level for level partition of the point cloud bitstream belongs is $2^{shifbits0}$.

Secondly, a difference in the number of levels between the N-th level and the initial level is determined.

It is assumed that the initial level is the first level, and then the difference is N−1.

Thirdly, the size information of the node to which the initial level belongs is adjusted according to the difference, to obtain adjusted size information.

The initial number of right-shift bits is added with the difference to determine the number of right-shift bits of the N-th level. The size of the node to which the initial level belongs is adjusted by the number of right-shift bits of the N-th level, to obtain the adjusted size information. For example, if the difference is N−1, the number of right-shift bits of the N-th level is shiftbits0+(N−1), $2^{shifbits0}$ is increased by $2^{N-1}$ times and the adjusted size information is determined as $2^{N-1+shifbits0}$.

Finally, the node to which the N-th level belongs is determined according to the adjusted size information.

The adjusted size information is determined as the size of the node to which the N-th level belongs. For example, $2^{N-1+shifbits0}$ is determined as the size of the node to which the N-th level belongs.

At step C2, the maximum permissible value is determined according to the node to which the N-th level belongs and the root node.

The maximum number of levels is determined by comparing the size of the node to which the N-th level belongs with the size of the root node.

In some possible implementations, the operation that the maximum permissible value is determined according to the node to which the N-th level belongs and the root node may be implemented by the following actions.

Firstly, size information of the root node is determined.

The size information of the root node is a length of a longest side of the bounding box.

Secondly, a first difference between the adjusted size information and the size information of the root node is determined.

The adjusted size information is compared with the size information of the root node, and the first difference is determined by subtracting the adjusted size information from the size information of the root node. For example, if the adjusted size information is $2^{N-1+shifbits0}$ and the size information of the root node is $2^{maxRootNodeDimLog2}$, then the first difference is $2^{maxRootNodeDimLog2}-2^{N-1+shifbits0}$.

Finally, if the first difference is less than or equal to a first preset threshold, the number of levels corresponding to the N-th level is determined as the maximum permissible value.

Herein, the first preset threshold is an integer close to 0. When the first difference is close to 0, it is indicated that the size of the node to which the N-th level belongs is very close to the size of the root node, which indicates that the number of levels corresponding to the N-th level is the maximum number of levels for level partition of the point cloud bitstream. Therefore, the number of levels corresponding to the N-th level, where the size of the node to which it belongs is very close to that of the root node, is determined as the maximum permissible value. As such, a range of a syntax element lifting_num_detail_levels_minus1 can be adaptively set according to the attribute information of the point cloud.

In the first implementation, the point cloud data is processed by using an attribute parameter set of the input point cloud, so as to determine the initial number of right-shift bits of the point cloud. The size of the node corresponding to the initial partitioned level is determined based on the initial number of right-shift bits. Then, for each partition of the level, the initial number of right-shift bits is increased and the size of the node corresponding to the level is also increased, so that the number of right-shift bits of the N-th level and the size of the node corresponding to the N-th level can be determined. Finally, the maximum permissible value is determined by comparing the size of the node corresponding to the N-th level with the target length.

In a second implementation, the LOD partition of the point cloud is performed based on the sampling distance. Firstly, a sampling distance of the N-th level is determined by combining the initial sampling distance in the attribute information and a ratio between sampling distances of two adjacent levels. Then, the maximum permissible value is determined by comparing the sampling distance of the N-th level and a target length. The process may be implemented as follows.

At step A, a diagonal distance of a root node is determined according to a length, a width and a height of the root node.

A length of a longest diagonal of a bounding box is determined as the target length. Lengths of three sides perpendicular to each other in the bounding box are determined according to a size of the root node in the attribute information of the point cloud, and a distance between two farthest vertices in the bounding box, i.e. the length of the longest diagonal is determined according to the lengths of the three sides, to determine the target length. In a specific example, the size of the root node is $2^{maxRootNodeDimLog2}$, and the lengths of the three sides are $2^{gbh.rootNodeSizeLog2[k]}$ (k=0, 1, 2), respectively.

At step B, the maximum permissible value is determined according to the diagonal distance of the root node and the value of the first right-shift parameter.

In some possible implementations, the step B may be implemented by the following steps.

At step B1, a first ratio is determined.

Herein, the first ratio is a ratio between the diagonal distance of the root node and an arithmetic square root of the value of the first right-shift parameter, for example, a ratio between the sampling distances of a first level and a second level. In an exemplary embodiment of the present disclosure, a ratio between sampling distances of each two adjacent levels may be set to be the same, for example, may be set to P. In other embodiments, the ratio between the sampling distances of each two adjacent levels may also be set to be different.

At step B2, a logarithm value of the first ratio is determined.

The logarithm value of the first ratio can be understood as the sampling distance of the N-th level, and the sampling distance of the N-th level may be determined according to the length of the longest diagonal of the bounding box and the first ratio. For example, a sampling distance of a next level may be determined by multiplying the initial sampling distance by the first ratio, and so on until the sampling distance of the N-th level is determined.

In some possible implementations, the first ratio between sampling distances of adjacent LODs is determined according to the geometry information of the point cloud, and the first ratio is set according to sparseness of point cloud coordinates in the geometry information of the point cloud. The first ratio may be set to a number greater than 1, to ensure that collection of the point cloud is sparser level by level as the number of levels increases during the level partition of the point cloud.

At step B3, the logarithm value is determined as the maximum permissible value.

A ratio between the sampling distances of the adjacent LODs is determined as the base corresponding to the logarithm value. In some embodiments, the sampling distance of the N-th level is compared with the length of the longest diagonal of the bounding box. If the sampling distance of the N-th level is very close to the length of the longest diagonal of the bounding box, it is indicated that the N-th level is a last level for level partition of the point cloud, that is, the number of levels corresponding to the N-th level is the maximum permissible value.

In some exemplary embodiments, when the LOD partition is performed based on the distance, the maximum permissible value may be set based on the longest diagonal of the bounding box, which may be implemented as follows.

At a first operation, lengths of three sides perpendicular to each other in the bounding box are determined.

If the bounding box is a cube, the three sides perpendicular to each other in the bounding box can be understood as a length, a width and a height of the cube.

At a second operation, a length of the longest diagonal is determined according to the lengths of the three sides.

It is assumed that the lengths of the three sides are $2^{gbh.rootNodeSizeLog \, 2[k]}$ (k=0, 1, 2), respectively. According to Pythagorean theorem, the length of the longest diagonal is $$\sqrt{\sum_{k=0}^{2}(2^{gbh.rootNodeSizeLog2[k]})^2}.$$

According to the first operation and the second operation, when the LOD partition is performed based on the distance, the length of the longest diagonal is determined based on the lengths of the three perpendicular sides of the bounding box, and the target length for setting the maximum permissible value can be determined.

In some exemplary embodiments, in a case that the LOD partition is performed based on the distance, the sampling distance of the N-th level may be determined according to the sampling distances of two adjacent levels and the ratio between the sampling distances, which may be implemented as follows.

At a first operation, sampling distances of at least two sets of adjacent levels are determined to determine a sampling distance set.

Sampling distances of multiple sets of adjacent levels are determined by analyzing an initial sampling distance and a total number of sampling levels in the attribute information. For example, sampling distances of a first level and a second level, sampling distances of a third level and a fourth level, sampling distances of a fifth level and a sixth level, etc., are determined respectively, to form the sampling distance set. In other words, the sampling distance set includes the sampling distances of multiple sets of adjacent levels.

At a second operation, a ratio between the sampling distances of two adjacent levels in the sampling distance set is determined, to determine a preset sampling distance ratio.

The ratio between the sampling distances of two adjacent levels in the sampling distance set is calculated. In an exemplary embodiment of the present disclosure, a ratio between the sampling distances of each two adjacent levels is the same, and the same ratio is determined as the preset sampling distance ratio. The preset sampling distance ratio may be determined by calculating the ratio between the sampling distances of two adjacent levels, or may be set in advance.

At a third operation, the sampling distance of the N-th level is determined according to the preset sampling distance ratio and the initial sampling distance in the attribute information.

Firstly, a difference in the number of levels between the N-th level and a level corresponding to the initial sampling distance in the attribute information is determined. Then, the n-th power (n is equal to the difference) of the preset sampling distance ratio is determined. Finally, the resulting product is multiplied by the target length to determine the sampling distance of the N-th level. For example, if the difference in the number of levels between the N-th level and the level corresponding to the initial sampling distance is N−1 and the preset sampling distance ratio is P, then the sampling distance of the N-th level is $P^{N-1}D_l$.

In an exemplary embodiment of the present disclosure, the sampling distance ratio is determined by determining the sampling distances of two adjacent levels in the attribute information, and the sampling distance of the N-th level is determined by combining the sampling distance ratio and the initial sampling distance. Thus, when the LOD partition is performed based on the distance, the sampling distance of each level may be determined, so as to set the maximum permissible value.

In some exemplary embodiments, in a case that the LOD partition is performed based on the distance, the maximum permissible value may be set by comparing the sampling distance of the N-th level with the target length, which may be implemented as follows.

At a first operation, a second difference between the sampling distance of the N-th level and the target length is determined.

Herein, a difference between the sampling distance of the N-th level and the longest diagonal of the bounding box is determined as the second difference. For example, the sampling distance of the N-th level is $P^{N-1}D_l$, the longest diagonal of the bounding box is $$\sqrt{\sum_{k=0}^{2}(2^{gbh.rootNodeSizeLog2[k]})^2},$$

and the second difference is $$\sqrt{\sum_{k=0}^{2}(2^{gbh.rootNodeSizeLog2[k]})^2} - P^{N-1}D_1.$$

At a second operation, if the second difference is less than or equal to a second preset threshold, the number of levels corresponding to the N-th level is determined as the maximum permissible value.

Herein, the second preset threshold is a positive number close to 0 and may be the same as or different from the first preset threshold. If the second difference is less than or equal to the second preset threshold, it is indicated that the sampling distance of the N-th level is very close to the length of the longest diagonal of the bounding box, which further indicates that the N-th level is a last level for level partition of the point cloud bitstream. Therefore, the number of levels corresponding to the N-th level may be determined as the maximum permissible value.

In the second implementation, firstly, in response to receiving a setting instruction, the value of the first syntax element is determined within a range formed by the maximum permissible value. Specifically, when the instruction for setting the number of levels input by the user is received, a number may be selected from the range formed by the maximum permissible value and used as the value of the first syntax element. For example, if the range formed by the maximum permissible value is [0, 20], then 18 may be selected as the value of the first syntax element. Partition of the point cloud is performed according to the value of the first syntax element. In such way, in the exemplary embodiment of the present disclosure, the maximum number of partitionable levels of the point cloud data can be adaptively determined according to the geometry information and the attribute information of the point cloud data, thereby specifying the maximum permissible value for level partition of the point cloud data. Therefore, the number of levels for the LOD partition set by the user can be checked at both the encoding side and the decoding side, and a consistency between the number of levels set by the user and the actual number of levels can be increased.

In some exemplary embodiments, after the maximum permissible value for level partition of the point cloud data is set, the number of levels for the LOD partition set by the user may be checked at both the encoding side and the decoding side, to increase consistency of a system. After the point cloud bitstream is partitioned according to the maximum permissible value, the method further includes the following operations.

At a first operation, a preset number of levels for level partition of the point cloud is determined.

The preset number of levels for level partition of the point cloud bitstream inputted by the user may be determined when the user performs level partition on the point cloud at the encoding side or the decoding side. For example, the preset number of levels for level partition of the point cloud bitstream set by the user is 30.

At a second operation, validity of the preset number of levels is determined according to the maximum permissible value.

It is determined whether the preset number of levels is within the range formed by the maximum permissible value. In response to the preset number of levels being within the range formed by the maximum permissible value, the preset number of levels is determined to be valid, that is, the preset number of levels is available. In response to the preset number of levels not within the range formed by the maximum permissible value, the preset number of levels is determined to be invalid, that is, the preset number of levels is unavailable. In a specific example, if the preset number of levels is 30 and the maximum permissible value is 21, the preset number of levels is invalid.

At a third operation, if the validity of the preset number of levels indicates that the preset number of levels is less than or equal to the maximum permissible value, the level partition is performed on the point cloud according to the preset number of levels.

Herein, if the preset number of levels is less than or equal to the maximum permissible value, i.e., the preset number of levels is within the range formed by the maximum permissible value, it is indicated that the preset number of levels is available, and the level partition can be performed on the point cloud according to the preset number of levels. Thus, the number of levels for the LOD partition set by the user can be checked at both the encoding side and the decoding side, and the consistency between the desired number of levels for the LOD partition set by the user and the actual number of levels in the LOD partition can be increased.

Figure 3:
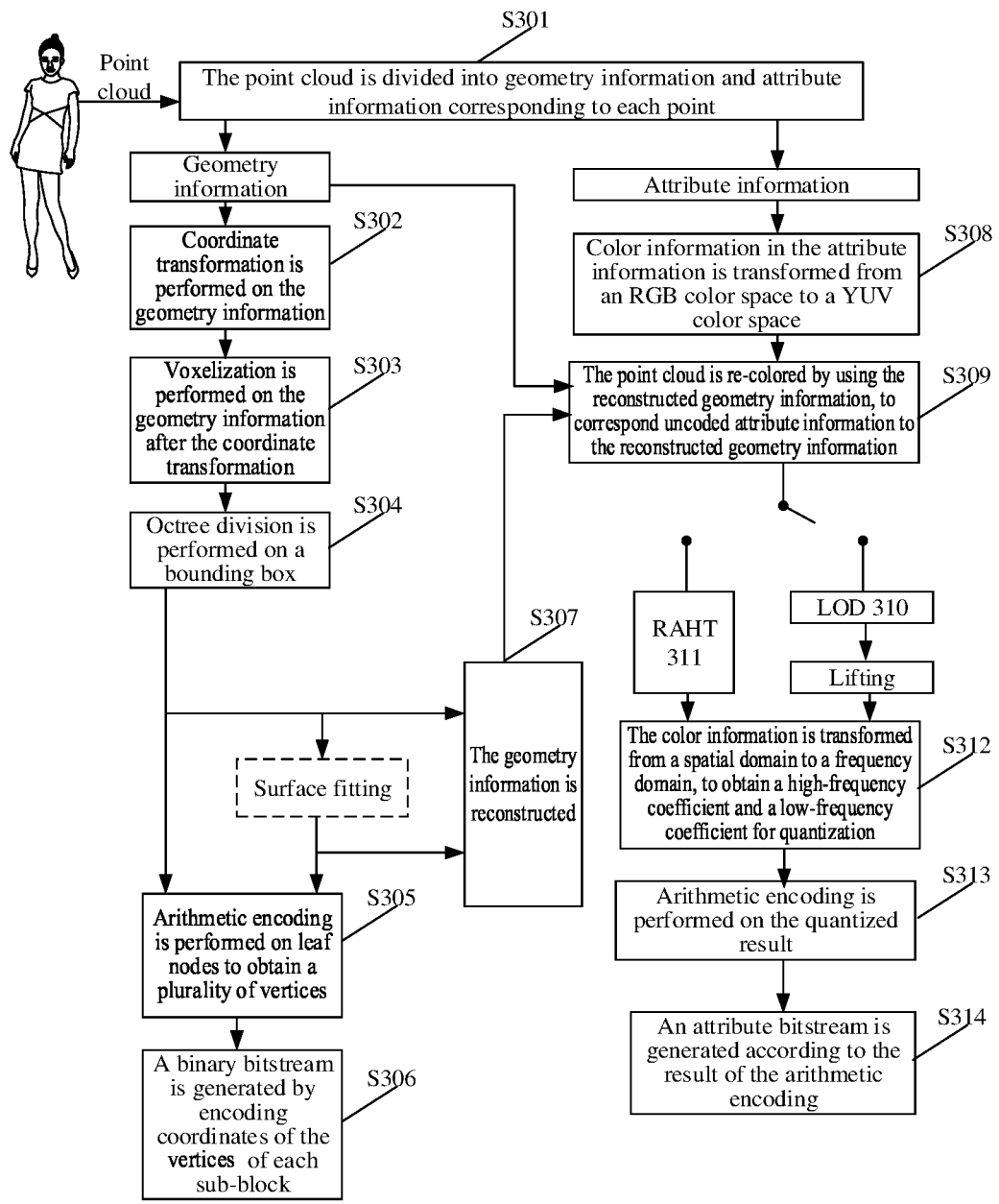
FIG. 3 is a schematic flowchart of point cloud compression and encoding according to an exemplary embodiment of the present disclosure.

In some embodiments, a procedure of point cloud compression and encoding is illustrated in FIG. 3, and FIG. 3 is a schematic flowchart of the point cloud compression and encoding according to an exemplary embodiment of the present disclosure. The procedure is described below with reference to operations illustrated in FIG. 3.

At operation S301, the point cloud is partitioned into geometry information and attribute information corresponding to each point.

Herein, in a geometric-based G-PCC encoder framework, the geometry information of the point cloud and the attribute information corresponding to each point are encoded separately.

At operation S302, coordinate transformation is performed on the geometry information.

Specifically, the coordinate transformation is performed on the geometry information, so that the point cloud is all contained in a bounding box.

At operation S303, voxelization is performed on the geometry information after the coordinate transformation.

The operation that the voxelization is performed on the geometry information after the coordinate transformation may be understood as quantization of the geometry information after the coordinate transformation. The quantization is mainly used for scaling. After the quantization and rounding, the geometry information of some points is the same. It is determined whether to remove repeated points according to a parameter, and the quantization is performed and the repeated points are removed.

At operation S304, octree partition is performed on the bounding box.

Octree partition is performed on the bounding box. In an octree-based geometry information encoding framework, the bounding box is partitioned equally into eight sub-cubes, and a non-empty sub-cube (i.e., including points in the point cloud) is further partitioned into eight equal parts until the resulting leaf node is a 1×1×1 unit cube, and the points in the leaf node are encoded to generate a binary bitstream.

At operation S305, arithmetic encoding is performed on the leaf node to determine a plurality of vertices.

Surface fitting is performed on the leaf node for geometric reconstruction of the binary bitstream of the determined geometry information. In a triangle soup (trisoup)-based geometry information encoding framework, the octree partition is also performed at first. However, unlike the encoding of the geometric information based on the octree in which the point cloud is partitioned stage by stage into unit cubes with a side length of 1×1×1, the method stops partition when a side length of a sub-block is W. According to a surface formed by point cloud distribution in each sub-block, at most twelve vertices formed by the surface and twelve sides of the sub-block are determined. The binary bitstream is generated by encoding coordinates of the vertices of each sub-block in turn.

At operation S306, the binary bitstream is generated by encoding coordinates of the vertices of each sub-block.

Specifically, a geometry bitstream is generated by encoding the coordinates of the vertices of each sub-block.

The operations S301 to S306 complete a process of encoding the geometry information. After the geometry information is encoded, the geometry information is reconstructed, and the procedure proceeds to operation S307.

At operation S307, the geometry information is reconstructed.

The reconstruction of the geometry information can be understood as a process of decoding the encoded bitstream and re-determining decoded geometry information, that is, reconstructed geometry information.

In an exemplary embodiment of the present disclosure, attribute encoding is mainly performed on the color information.

At operation S308, color information in the attribute information is transformed from an RGB color space to a YUV color space.

At operation S309, the point cloud is re-colored by using the reconstructed geometry information, to correspond unencoded attribute information to the reconstructed geometry information.

There are mainly two transformation manners for encoding the color information. In a first manner, a distance-based lifting transformation is implemented depending on LOD partition in an LOD partition module generation process 310. In a second manner, a region adaptive hierarchical transformation (RAHT) 311 is performed directly. Both of the two manners may transform the color information from a spatial domain to a frequency domain, and to determine a high-frequency coefficient and a low-frequency coefficient through the transformation. Finally, the coefficients are quantized and encoded to generate the binary bitstream.

At operation S312, the color information is transformed from the spatial domain to the frequency domain, to determine the high-frequency coefficient and the low-frequency coefficient for quantization.

At operation S313, arithmetic encoding is performed on the quantized result.

At operation S314, an attribute bitstream is generated according to the result of the arithmetic encoding.

Figure 4:
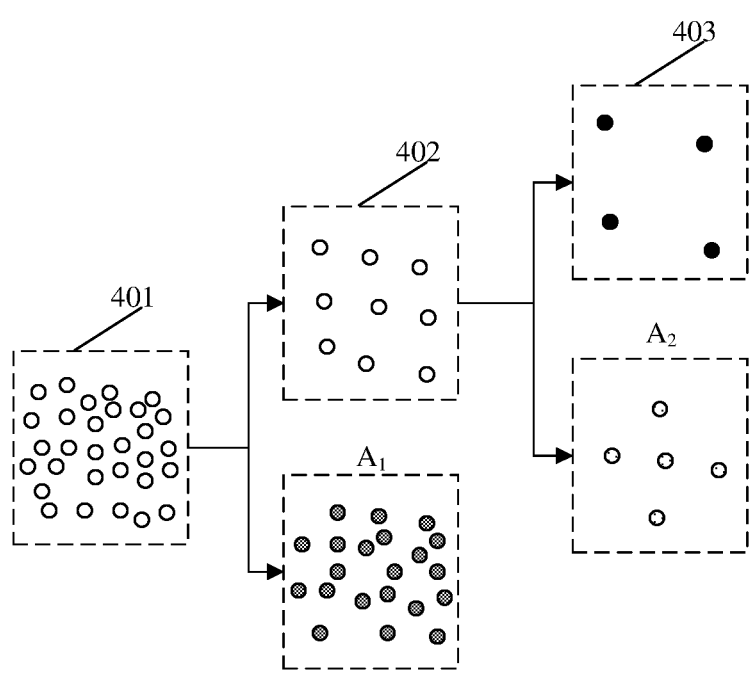
FIG. 4 is a schematic flowchart of an implementation of LOD partition according to an exemplary embodiment of the present disclosure.

The above operations S308 to S314 realize a process of encoding the attribute information, and the encoding of the attribute information includes three modes: a prediction mode, a lifting mode and an RAHT mode. For the prediction mode and lifting mode, LOD partition of the point cloud is required. The LOD partition is a process of partitioning the point cloud into a series of enhancement levels and detail levels according to a certain method. As illustrated in FIG. 4, FIG. 4 a schematic flowchart of an implementation of an LOD partition according to an exemplary embodiment of the present disclosure. The process is described below with reference to FIG. 4.

A point set 401 (LOD1) is divided into a set A1 which represents point cloud detail information and a point set 402 (LOD2) which represents point cloud skeleton information. Then, the point set 402 is divided into a set A2 which represents point cloud detail information and a point set 403 (LOD3) which represents point cloud skeleton information.

In the related art, a number of levels in the LOD partition is not specified, and is set manually by the user. In addition, a range of the number of levels in the LOD partition is also not specified. In a general test condition of G-PCC, the number of levels in the LOD partition is often set to a large number, which leads to inconformity between a set value and an actual number of partitioned levels.

Therefore, an exemplary embodiment of the present disclosure provides a method for level partition of a point cloud. According to the method, a maximum range of a syntax element parameter, lifting_num_detail_levels_minus1, is defined, a maximum value, MAX_minus1, of the syntax element, lifting_num_detail_levels_minus1, is defined, and the parameter is in a range of 0 to MAX_minus1.

Figure 5:
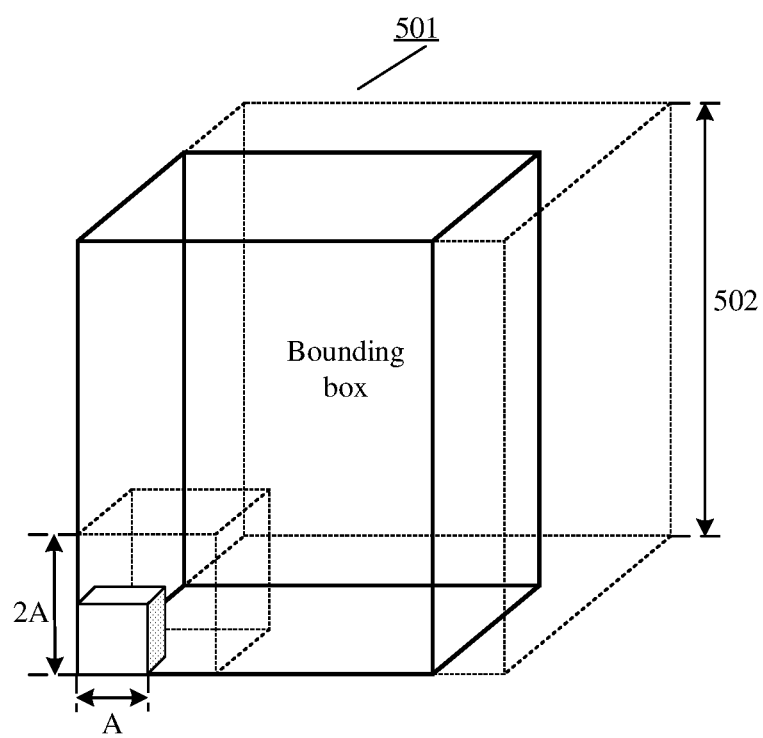
FIG. 5 is a schematic structural diagram of a Morton code-based LOD partition according to an exemplary embodiment of the present disclosure.

FIG. 5 is a schematic structural diagram of a Morton code-based LOD partition according to an exemplary embodiment of the present disclosure. The process is described below with reference to FIG. 5.

As illustrated in FIG. 5, a box 501 represents a bounding box of a point cloud and dotted lines 502 represent a cube whose side length is equal to a length of a longest side of the bounding box.

In some embodiments, in a point cloud compression process, a size of the bounding box of the point cloud may be determined from the encoding of the geometry information, and a cube, i.e., a root node of the point cloud is constructed according to the longest side.

In a possible implementation, in a process of LOD generation based on right-shifting of the Morton code, firstly, a abh.atttr_dist2_delta is calculated from aps.dist2 and the input point cloud, and then an initial number of right-shift bits shiftbits0 is calculated from aps.dist2 and abh.atttr_dist2_delta, as illustrated in formula (3):

$$\text{shiftbits0} = \text{aps.dist2} + \text{abh.attr\_dist2\_delta} \quad (3);$$

where a number of right-shift bits at the first time is shiftbits0, and the corresponding node size is $2^{shifbits0}$, which is represented as A in FIG. 5. Then, for each partition of the level during the LOD partition, shiftbits is added by 1. A side length of a node is increased to twice the side length of the node of the previous level for each one-bit right-shift, and the side length is represented as 2A in FIG. 5.

When the partition is performed to the N-th level, shiftbits=shiftbits0+(N−1), and the size of the node is $2^{N-1+shifbits0}$. In an exemplary embodiment of the present disclosure, a termination condition for the LOD partition is that: the LOD partition is terminated when the partition is performed to the root node. At this time, the size of the root node is $2^{maxRootNodeDimLog2}$, and formula (4) can be determined:

$$2^{N-1+shifbits0} \leq 2^{maxRootNodeDimLog2} \quad (4).$$

Further, formula (5) can be determined:

$$N \leq \text{maxRootNodeDimLog 2} - \text{shiftbits0} + 1 \quad (5).$$

Then, a maximum number of levels in the LOD partition, max(N), is determined in formula (6):

$$\max(N) = \text{maxRootNodeDimLog2} - \text{shiftbits0} + 1 \quad (6).$$

For lifting_num_detail_levels_minus1, the maximum value is max (N)−1, which is illustrated in formula (7):

$$\begin{aligned}\text{MAX\_minus1} = &\text{gbh.maxRootNodeDimLog} \\ &2 - \text{aps.dist2} - \text{abh.atur\_dist2\_delta}\end{aligned} \quad (7).$$

According to the formula (7), a range of lifting_num_detail_levels_minus1 may be determined as [0, MAX_minus1].

In an exemplary embodiment of the present disclosure, the maximum partitionable number of LODs can be adaptively determined according to the content of the point cloud, thereby specifying a range of the syntax element lifting_num_detail_levels_minus1. Therefore, the parameter levelOfDetailCount (the number of levels in the LOD partition) set by the user can be checked at both the encoding side and the decoding side, thereby increasing consistency of the system.

Figure 6:
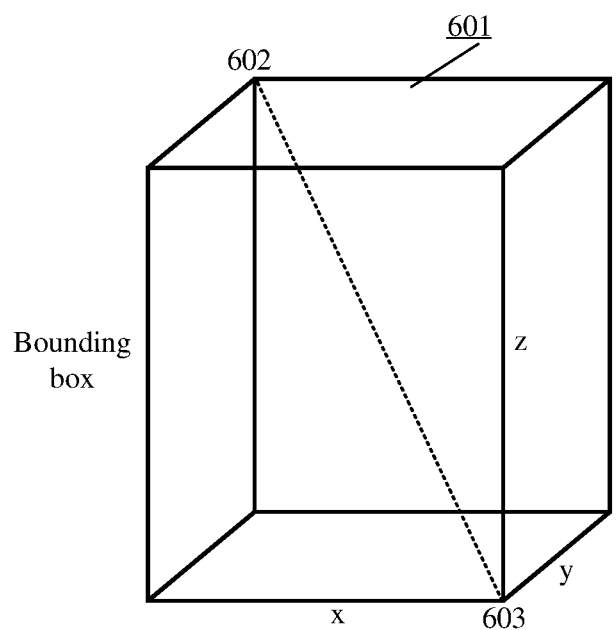
FIG. 6 is a schematic structural diagram of a distance-based LOD partition according to an exemplary embodiment of the present disclosure.

In some embodiments, when the LOD partition is performed based on the distance, a process of setting a maximum number of levels of the LOD partition is illustrated in FIG. 6. FIG. 6 is a schematic structural diagram of a distance-based LOD partition according to an exemplary embodiment of the present disclosure. The process is described below with reference to FIG. 6.

For the distance-based LOD partition, a distance between two farthest points in the point cloud is searched, and the distance between the two farthest points (point 602 and point 603) in the point cloud may be approximately calculated according to the bounding box 601. The distance between the point 602 and point 603 is taken as a diagonal length of the bounding box, and three sides x, y and z of the bounding box are $2^{gbh.rootNodeSizeLog\ 2[k]}$ (where k=0, 1 or 2), respectively. The distance between the two farthest points in theory is set to maxDist and is calculated in formula (8):

$$\text{maxDist} = \sqrt{\sum_{k=0}^{2}\left(2^{gbh.rootNodeSizeLog2[k]}\right)^2}. \quad (8)$$

On basis of the formula (8), an initial sampling distance is set to D1 and a ratio between sampling distances of two adjacent levels is P, then the sampling distance of the N-th level may be expressed as $D_N=P^{N-1}D_1$.

For the number of levels N, since $D_N \leq maxDist$, $$N \leq \log_P \frac{\max Dist}{D_1} + 1.$$

Then, for the syntax element lifting_num_detail_levels_minus1, the maximum value MAX_minus1 is max(N)−1, which may be expressed as formula (9):

$$MAX\_minus1 = \log_P \frac{\max Dist}{D_1}; \qquad (9)$$

where $D_1 = \sqrt{aps.dist2}$. Then MAX_minus1 may be expressed as formula (10):

$$MAX\_minus1 = \frac{1}{2}\log_P \frac{\sum_{k=0}^{2}(2^{gbh \cdot rootNodeSizeLog2[k]})^2}{aps.dist2}. \qquad (10)$$

In an exemplary embodiment of the present disclosure, the maximum partitionable number of LODs can be adaptively determined according to the content of the point cloud, thereby specifying a range of the syntax element lifting_num_detail_levels_minus1. Therefore, the number of levels of the LOD partition set by the user can be checked at the encoding side, and consistency between the desired number of LODs set by the user and the actual number of LODs can be increased.

As illustrated in FIG. 7A, there is provided a decoder 1 in an embodiment of the present disclosure. The decoder includes a first decoding module 701, a first determination module 702, a first parsing module 703, a second determination module 704 and a second decoding module 705.

The first decoding module 701 is configured to decode a point cloud bitstream. The point cloud bitstream includes geometry information and attribute information of a point cloud.

The first determination module 702 is configured to determine a maximum permissible value of a first syntax element in the point cloud bitstream.

The first parsing module 703 is configured to parse the point cloud bitstream to determine a value of the first syntax element according to the maximum permissible value.

The second determination module 704 is configured to determine, according to the value of the first syntax element, a number of LODs in a process of decoding the attribute information.

The second decoding module 705 is configured to decode the attribute information according to the number of the LODs and the geometry information, to determine a reconstructed point cloud of the point cloud.

In some embodiments of the present disclosure, the first determination module 702 is further configured to: parse the point cloud bitstream to determine a conformance parameter; and determine the maximum permissible value according to a preset correspondence between the conformance parameter and the maximum permissible value. The conformance parameter includes at least one of a profile, a tier or a level.

In some embodiments of the present disclosure, the first determination module 702 is further configured to: set the maximum permissible value to a preset constant. The constant is an integer greater than 0.

In some embodiments of the present disclosure, the constant is an integer greater than 0 and less than or equal to a preset threshold.

In some embodiments of the present disclosure, the first determination module 702 is further configured to: parse the point cloud bitstream to determine a length, a width and a height of a root node; parse the point cloud bitstream to determine a value of a first right-shift parameter; and determine the maximum permissible value according to the value of the first right-shift parameter and the length, the width and the height of the root node.

In some embodiments of the present disclosure, the first parsing module 703 is further configured to: parse the point cloud bitstream to determine an initial sampling distance for characterizing the point cloud bitstream; and determine the initial sampling distance as the value of the first right-shift parameter.

In some embodiments of the present disclosure, the first determination module 702 is further configured to: parse the geometry information in the point cloud bitstream to determine the length, the width and the height of the root node.

In some embodiments of the present disclosure, the first determination module 702 is further configured to: parse unit header information in the geometry information to determine the length, the width and the height of the root node.

In some embodiments of the present disclosure, the first determination module 702 is further configured to: set a maximum among the length, the width and the height of the root node as a maximum dimension of the root node; parse the point cloud bitstream to determine a value of a second right-shift parameter; and determine a difference between the maximum dimension of the root node and a sum of the first right-shift parameter and the second right-shift parameter as the maximum permissible value.

In some embodiments of the present disclosure, the first determination module 702 is further configured to: parse the point cloud bitstream to determine an initial sampling distance of each of blocks in the point cloud bitstream; calculate a sum of initial sampling distances of the blocks to determine a total initial sampling distance; and determine a difference between the total initial sampling distance and the first right-shift parameter as the second right-shift parameter.

In some embodiments of the present disclosure, the first determination module 702 is further configured to: determine a diagonal distance of the root node according to the length, the width and the height of the root node; and determine the maximum permissible value according to the diagonal distance of the root node and the value of the first right-shift parameter.

In some embodiments of the present disclosure, the first determination module 702 is further configured to: determine a first ratio, the first ratio being a ratio between the diagonal distance of the root node and an arithmetic square root of the value of the first right-shift parameter; determine a logarithm value of the first ratio; and determine the logarithm value as the maximum permissible value. A base corresponding to the logarithm value is set as a ratio between sampling distances of adjacent LODs.

In some embodiments of the present disclosure, the first determination module 702 is further configured to: parse the point cloud bitstream to determine the first ratio between the sampling distances of the adjacent LODs.

In some embodiments of the present disclosure, the first determination module 702 is further configured to: determine a number of bits N, corresponding to the first syntax element, in the bitstream according to the maximum permissible value; and parse N bits from the point cloud bitstream, and convert the N bits into the value of the first syntax element.

In some embodiments of the present disclosure, the first determination module 702 is further configured to: determine a minimum number of bits required for representing the maximum permissible value using an unsigned binary number; and determine the minimum number of bits as the number of bits N.

In some embodiments of the present disclosure, the first determination module 702 is further configured to: set a value corresponding to the N-bit unsigned binary number as the value of the first syntax element.

In some embodiments of the present disclosure, the first determination module 702 is further configured to: compare the value of the first syntax element with the maximum permissible value; and in response to the value of the first syntax element being greater than the maximum permissible value, generate an exception report message.

In some embodiments of the present disclosure, the second decoding module 705 is further configured to: determine one or more reconstructed values for one or more LODs in the point cloud bitstream according to the number of the LODs and the geometry information; and determine the reconstructed point cloud of the point cloud according to the one or more reconstructed values for the one or more LODs.

In some embodiments of the present disclosure, the second decoding module 705 is further configured to: perform LOD partition on the point cloud bitstream according to the number of LODs and the geometry information, to determine the one or more reconstructed values for the one or more LODs.

In practical application, as illustrated in FIG. 7B, there is provided a decoder 1 in an embodiment of the present disclosure. The decoder includes a first memory 721 and a first processor 722. The first memory 721 stores a computer program executable on the first processor 722 and causing the first processor 722 to implement the method for level partition of the point cloud at the decoder side when being executed by the first processor.

As illustrated in FIG. 8A, there is provided an encoder 2 in an embodiment of the present disclosure. The encoder includes a first determining module 801, a first determination module 802, a first partition module 803, a first encoding module 804 and a second encoding module 805.

The first determining module 801 is configured to determine geometry information and attribute information of a point cloud.

The first determination module 802 is configured to determine a maximum permissible value of a first syntax element. The first syntax element represents a number of LODs in a process of encoding the attribute information of the point cloud.

The first partition module 803 is configured to perform LOD partition on the point cloud according to the maximum permissible value and the geometry information of the point cloud, and determine a value of the first syntax element.

The first encoding module 804 is configured to encode the point cloud according to the LOD partition for the point cloud, to generate a bitstream.

The second encoding module 805 is configured to encode the value of the first syntax element, and signal encoded bits into the bitstream.

In some embodiments of the present disclosure, the first determination module 802 is further configured to: determine a conformance parameter of the point cloud, the conformance parameter including at least one of a profile, a tier or a level; determine the maximum permissible value according to a preset correspondence between the conformance parameter and the maximum permissible value; and encode the conformance parameter and signal encoded bits into the bitstream.

In some embodiments of the present disclosure, the first determination module 802 is further configured to: set the conformance parameter according to a configuration parameter of the encoder.

In some embodiments of the present disclosure, the first determination module 802 is further configured to: sett the conformance parameter according to a parameter determined in a session negotiation process.

In some embodiments of the present disclosure, the first determination module 802 is further configured to: set the maximum permissible value to a preset constant. The constant is an integer greater than 0.

In some embodiments of the present disclosure, the first determination module 802 is further configured to: set the preset constant according to a configuration parameter of the encoder. The constant is an integer greater than 0 and less than or equal to a preset threshold.

In some embodiments of the present disclosure, the first determination module 802 is further configured to: determine a length, a width and a height of a root node; determine a value of a first right-shift parameter according to the geometry information of the point cloud; and determine the maximum permissible value according to the value of the first right-shift parameter and the length, the width and the height of the root node.

In some embodiments of the present disclosure, the first determination module 802 is further configured to: determine an initial sampling distance, in the geometry information, for characterizing the point cloud; and determine the initial sampling distance as the value of the first right-shift parameter.

In some embodiments of the present disclosure, the first determination module 802 is further configured to: determine a bounding box of the point cloud according to the geometry information of the point cloud; and determine the root node of the point cloud according to the bounding box, to determine the length, the width and the height of the root node of the point cloud.

In some embodiments of the present disclosure, the first determination module 802 is further configured to: determine a target length that satisfies a preset condition from dimensions of the bounding box; and create the root node of the point cloud according to the target length.

In some embodiments of the present disclosure, the first determination module 802 is further configured to: determine a length of a longest side of the bounding box as the target length.

In some embodiments of the present disclosure, the first determination module 802 is further configured to: encode the length, the width and the height of the root node, and signal encoded bits into the bitstream.

In some embodiments of the present disclosure, the first determination module 802 is further configured to: signal the encoded bits into geometry data unit header information in the bitstream.

In some embodiments of the present disclosure, the first determination module 802 is further configured to: set a maximum among the length, the width and the height of the root node as a maximum dimension of the root node; determine a value of a second right-shift parameter according to the geometry information of the point cloud; and set a difference between the maximum dimension of the root node and a sum of the first right-shift parameter and the second right-shift parameter as the maximum permissible value.

In some embodiments of the present disclosure, the first determination module 802 is further configured to: determine, in the geometry information, an initial sampling distance of each of blocks of the point cloud; and calculate a sum of initial sampling distances of the blocks to determine a total initial sampling distance; and determine a difference between the total initial sampling distance and the first right-shift parameter as the second right-shift parameter.

In some embodiments of the present disclosure, the first determination module 802 is further configured to: determine a diagonal distance of the root node according to the length, the width and the height of the root node; and determine the maximum permissible value according to the diagonal distance of the root node and the value of the first right-shift parameter.

In some embodiments of the present disclosure, the first determination module 802 is further configured to: determine a first ratio, the first ratio being equal to a ratio between the diagonal distance of the root node and an arithmetic square root of the value of the first right-shift parameter; calculate a logarithm value of the first ratio; and set the logarithm value as the maximum permissible value. A base in the calculation of the logarithm value is set as a ratio between sampling distances of adjacent LODs.

In some embodiments of the present disclosure, the first encoding module 804 is further configured to: determine the first ratio between the sampling distances of the adjacent LODs according to the geometry information of the point cloud.

In some embodiments of the present disclosure, the first determination module 802 is further configured to: determine a number of bits N occupied by the first syntax element in the bitstream according to the maximum permissible value; and convert the value of the first syntax element into N bits, and signal the N bits into the bitstream.

In some embodiments of the present disclosure, the first determination module 802 is further configured to: determine a minimum number of bits required for representing the maximum permissible value using an unsigned binary number; and determine the minimum number of bits as the number of bits N.

In some embodiments of the present disclosure, the first determination module 802 is further configured to: convert the value of the first syntax element into bits corresponding to the N-bit unsigned binary number.

In some embodiments of the present disclosure, the value of the first syntax element is not greater than the maximum permissible value.

In some embodiments of the present disclosure, the first partition module 803 is further configured to: acquire a set of Morton codes of the point cloud; determine, in a range formed by the maximum permissible value, the value of the first syntax element according to the set of Morton codes and the geometry information; and perform the LOD partition on the point cloud according to the value of the first syntax element.

In practical application, as illustrated in FIG. 8B, there is provided an encoder.

The encoder includes a second memory 821 and a second processor 822.

The second memory 821 stores a computer program executable on the second processor 822 and causing the second processor 822 to implement the method for level partition of the point cloud at the encoder side when being executed by the second processor.

The description of the above apparatus embodiments is similar to that of the above method embodiments and has the same beneficial effect as that of the method embodiments. For the detail not disclosed in the device embodiments of the present disclosure, reference is made to the method embodiments of the present disclosure for understanding.

Correspondingly, there is provided a storage medium in an embodiment of the present disclosure. The storage medium has stored thereon a computer program which, when being executed by a first processor, causes the first processor to implement the method for level partition of the point cloud at the encoder; or when being executed by a second processor, causes the second processor to implement the method for level partition of the point cloud at the decoder.

It should be noted that the description of the above storage medium and apparatus embodiments is similar to that of the above method embodiments and has the same beneficial effect as that of the method embodiments. For the detail not disclosed in the storage medium and apparatus embodiments of the present disclosure, reference is made to the method embodiments of the present disclosure for understanding.

The foregoing descriptions are merely implementations of the disclosure, but are not intended to limit the scope of protection of the disclosure. Any variation or replacement readily figured out by a person skilled in the art within the technical scope disclosed in the disclosure shall fall within the scope of protection of the disclosure. Therefore, the scope of protection of the disclosure shall be subject to the scope of protection of the claims.

INDUSTRIAL APPLICABILITY

A method for level partition of a point cloud in an exemplary embodiment of the disclosure includes the following operations. A point cloud bitstream is decoded. The point cloud bitstream includes geometry information and attribute information of the point cloud. A maximum permissible value of a first syntax element in the point cloud bitstream is determined. The point cloud bitstream is parsed to determine a value of the first syntax element according to the maximum permissible value. A number of LODs in a process of decoding the attribute information is determined according to the value of the first syntax element. The attribute information is decoded according to the number of the LODs and the geometry information, to determine a reconstructed point cloud of the point cloud.

The invention claimed is:

1. A method for level partition of a point cloud, applied to a decoder, the method comprising:
   decoding a point cloud bitstream, wherein the point cloud bitstream comprises geometry information and attribute information of the point cloud;
   determining a maximum permissible value of a first syntax element in the point cloud bitstream based on a correspondence between the maximum permissible value and a level to which the point cloud bitstream conforms, the maximum permissible value indicating a maximum permissible number of levels of detail (LODs) for performing LOD partition on the point cloud;

parsing the point cloud bitstream to determine a value of the first syntax element according to the maximum permissible value;

determining, according to the value of the first syntax element, a number of LODs in a process of decoding the attribute information; and decoding the attribute information according to the number of the LODs and the geometry information, to determine a reconstructed point cloud of the point cloud.

2. The method of claim 1, wherein determining the maximum permissible value of the first syntax element in the point cloud bitstream comprises:

parsing the point cloud bitstream to determine a conformance parameter, wherein the conformance parameter comprises at least one of a profile, a tier, or a level; and determining the maximum permissible value according to a preset correspondence between the conformance parameter and the maximum permissible value.

3. The method of claim 1, wherein determining the maximum permissible value of the first syntax element in the point cloud bitstream comprises:

setting the maximum permissible value to a preset constant, wherein the constant is an integer greater than 0.

4. The method of claim 1, wherein determining the maximum permissible value of the first syntax element in the point cloud bitstream comprises:

parsing the point cloud bitstream to determine a length, a width and a height of a root node;

parsing the point cloud bitstream to determine a value of a first right-shift parameter; and determining the maximum permissible value according to the value of the first right-shift parameter and the length, the width and the height of the root node.

5. The method of claim 4, wherein determining the maximum permissible value according to the value of the first right-shift parameter and the length, the width and the height of the root node comprises:

setting a maximum among the length, the width and the height of the root node as a maximum dimension of the root node;

parsing the point cloud bitstream to determine a value of a second right-shift parameter; and determining a difference between the maximum dimension of the root node and a sum of the first right-shift parameter and the second right-shift parameter as the maximum permissible value.

6. The method of claim 4, wherein determining the maximum permissible value according to the value of the first right-shift parameter and the length, the width and the height of the root node comprises:

determining a diagonal distance of the root node according to the length, the width and the height of the root node; and determining the maximum permissible value according to the diagonal distance of the root node and the value of the first right-shift parameter.

7. The method of claim 1, wherein parsing the point cloud bitstream to determine the value of the first syntax element according to the maximum permissible value comprises:

determining a number of bits N, corresponding to the first syntax element, in the bitstream according to the maximum permissible value; and parsing N bits from the point cloud bitstream, and converting the N bits into the value of the first syntax element.

8. The method of claim 7, wherein determining the number of bits N, corresponding to the first syntax element, in the bitstream according to the maximum permissible value comprises:

determining a minimum number of bits required for representing the maximum permissible value using an unsigned binary number; and determining the minimum number of bits as the number of bits N.

9. The method of claim 7, wherein parsing the N bits from the point cloud bitstream and converting the N bits into the value of the first syntax element comprises:

setting a value corresponding to an N-bit unsigned binary number as the value of the first syntax element.

10. The method of claim 1, wherein decoding the attribute information according to the number of the LODs and the geometry information, to determine the reconstructed point cloud of the point cloud comprises:

determining one or more reconstructed values for one or more LODs in the point cloud bitstream according to the number of the LODs and the geometry information; and determining the reconstructed point cloud of the point cloud according to the one or more reconstructed values for the one or more LODs.

11. A method for level partition of a point cloud, applied to an encoder, the method comprising:

determining geometry information and attribute information of the point cloud;

determining a maximum permissible value of a first syntax element based on a correspondence between the maximum permissible value and a level to which the point cloud conforms, wherein the first syntax element represents a number of levels of detail (LODs) in a process of encoding the attribute information of the point cloud, the maximum permissible value indicates a maximum permissible number of LODs for performing LOD partition on the point cloud;

performing the LOD partition on the point cloud according to the maximum permissible value and the geometry information of the point cloud, and determining a value of the first syntax element;

encoding the point cloud according to the LOD partition for the point cloud, to generate a bitstream; and encoding the value of the first syntax element, and signaling encoded bits into the bitstream.

12. The method of claim 11, wherein determining the maximum permissible value of the first syntax element comprises:

determining a conformance parameter of the point cloud, wherein the conformance parameter comprises at least one of a profile, a tier, or a level;

determining the maximum permissible value according to a preset correspondence between the conformance parameter and the maximum permissible value; and encoding the conformance parameter and signaling encoded bits into the bitstream.

13. The method of claim 11, wherein determining the maximum permissible value of the first syntax element comprises:

setting the maximum permissible value to a preset constant, wherein the constant is an integer greater than 0.

14. The method of claim 11, wherein determining the maximum permissible value of the first syntax element comprises:
   determining a length, a width and a height of a root node;
   determining a value of a first right-shift parameter according to the geometry information of the point cloud; and
   determining the maximum permissible value according to the value of the first right-shift parameter and the length, the width and the height of the root node.

15. The method of claim 11, wherein encoding the value of the first syntax element and signaling the encoded bits into the bitstream comprises:
   determining a number of bits N occupied by the first syntax element in the bitstream according to the maximum permissible value; and
   converting the value of the first syntax element into N bits, and signaling the N bits into the bitstream.

16. The method of claim 15, wherein determining the number of bits N occupied by the first syntax element in the bitstream according to the maximum permissible value comprises:
   determining a minimum number of bits required for representing the maximum permissible value using an unsigned binary number; and
   determining the minimum number of bits as the number of bits N.

17. The method of claim 16, wherein converting the value of the first syntax element into the N bits comprises:
   converting the value of the first syntax element into bits corresponding to the unsigned binary number of N-bits.

18. The method of claim 11, wherein the value of the first syntax element is not greater than the maximum permissible value.

19. The method of claim 11, further comprising:
   after performing the LOD partition on the point cloud according to the maximum permissible value and the geometry information of the point cloud and determining the value of the first syntax element,
   acquiring a set of Morton codes of the point cloud;
   determining, in a range formed by the maximum permissible value, the value of the first syntax element according to the set of Morton codes and the geometry information; and
   performing the LOD partition on the point cloud according to the value of the first syntax element.

20. A decoder, comprising:
   a processor; and
   a memory storing a computer program executable on the processor;
   wherein the processor is configured to execute the computer program to:
   decode a point cloud bitstream, wherein the point cloud bitstream comprises geometry information and attribute information of a point cloud;
   determine a maximum permissible value of a first syntax element in the point cloud bitstream based on a correspondence between the maximum permissible value and a level to which the point cloud bitstream conforms, the maximum permissible value indicating a maximum permissible number of levels of detail (LODs) for performing LOD partition on the point cloud;
   parse the point cloud bitstream to determine a value of the first syntax element according to the maximum permissible value;
   determine, according to the value of the first syntax element, a number of LODs in a process of decoding the attribute information; and
   decode the attribute information according to the number of the LODs and the geometry information, to determine a reconstructed point cloud of the point cloud.

* * * * *